US010901762B1

(12) United States Patent
Kuklinski et al.

(10) Patent No.: US 10,901,762 B1
(45) Date of Patent: Jan. 26, 2021

(54) TUTORIAL CONTENT CREATION AND INTERACTION SYSTEM

(71) Applicant: FYIIO Inc., Lincoln, NE (US)

(72) Inventors: Alexander Kuklinski, Omaha, NE (US); Daniel Casson, Council Bluffs, IA (US)

(73) Assignee: FYIIO INC., Lincoln, NE (US)

( * ) Notice: Subject to any disclaimer, the term of this patent is extended or adjusted under 35 U.S.C. 154(b) by 0 days.

(21) Appl. No.: 16/356,923

(22) Filed: Mar. 18, 2019

Related U.S. Application Data

(60) Provisional application No. 62/645,622, filed on Mar. 20, 2018.

(51) Int. Cl.
| | |
|---|---|
| *G06F 3/048* | (2013.01) |
| *G06F 9/451* | (2018.01) |
| *H04N 21/472* | (2011.01) |
| *H04N 21/845* | (2011.01) |
| *H04N 21/43* | (2011.01) |
| *G06F 3/0484* | (2013.01) |

(52) U.S. Cl.
CPC .......... *G06F 9/453* (2018.02); *G06F 3/04847* (2013.01); *H04N 21/4307* (2013.01); *H04N 21/47217* (2013.01); *H04N 21/845* (2013.01)

(58) Field of Classification Search
None
See application file for complete search history.

(56) References Cited

U.S. PATENT DOCUMENTS

| | | |
|---|---|---|
| D593,114 S | 5/2009 | Vakkalanka |
| D691,160 S | 10/2013 | Schupp et al. |
| D695,778 S | 12/2013 | Edwards et al. |
| D695,779 S | 12/2013 | Edwards et al. |
| D721,382 S | 1/2015 | Brinda et al. |
| D741,897 S | 10/2015 | Wilkinson et al. |
| D759,099 S | 6/2016 | Pal et al. |
| D759,673 S | 6/2016 | Looney et al. |
| D765,689 S | 9/2016 | Wiley et al. |
| D767,604 S | 9/2016 | Wiley et al. |
| D772,890 S | 11/2016 | Bauer et al. |
| D782,517 S | 3/2017 | Zarick et al. |
| D785,022 S | 4/2017 | Vazquez et al. |
| D794,047 S | 8/2017 | Gandhi et al. |

(Continued)

OTHER PUBLICATIONS

U.S. Appl. No. 29/641,378, filed Mar. 21, 2018, Kuklinski.
U.S. Appl. No. 29/641,380, filed Mar. 21, 2018, Kuklinski.
U.S. Appl. No. 29/641,381, filed Mar. 21, 2018, Kuklinski.

*Primary Examiner* — William C Trapanese
(74) *Attorney, Agent, or Firm* — Suiter Swantz pc llo

(57) ABSTRACT

A system for generating tutorials is disclosed. In one embodiment, the system includes a user device including a user interface, wherein the user interface includes a display and a user input device. In another embodiment, the system includes one or more processors configured to: receive a video; display prompts on the display for entry of text entry by a user; receive text entries from the user via the user input device; synchronize text entries with selected segments of the video selected via a slidable video segment selection element; and generate a text searchable tutorial based on the synchronization of the first text entry with the first segment of the video and the synchronization of the additional text entry with the additional segment of the video.

13 Claims, 17 Drawing Sheets

(56) References Cited

U.S. PATENT DOCUMENTS

| | | |
|---|---|---|
| D814,488 S | 4/2018 | Wong et al. |
| D822,035 S | 7/2018 | Wu et al. |
| D823,860 S | 7/2018 | Wiffen et al. |
| D823,875 S | 7/2018 | Yuguchi et al. |
| D831,688 S | 10/2018 | Larsen et al. |
| D834,605 S | 11/2018 | Blechschmidt et al. |
| 2007/0154190 A1* | 7/2007 | Gilley .................. G11B 27/034 386/241 |
| 2008/0184117 A1 | 7/2008 | Alsbury et al. |
| 2014/0115471 A1 | 4/2014 | Demkin et al. |
| 2015/0205930 A1 | 7/2015 | Shaanan et al. |
| 2015/0309701 A1 | 10/2015 | Jatzold et al. |
| 2016/0364687 A1 | 12/2016 | Matson et al. |

\* cited by examiner

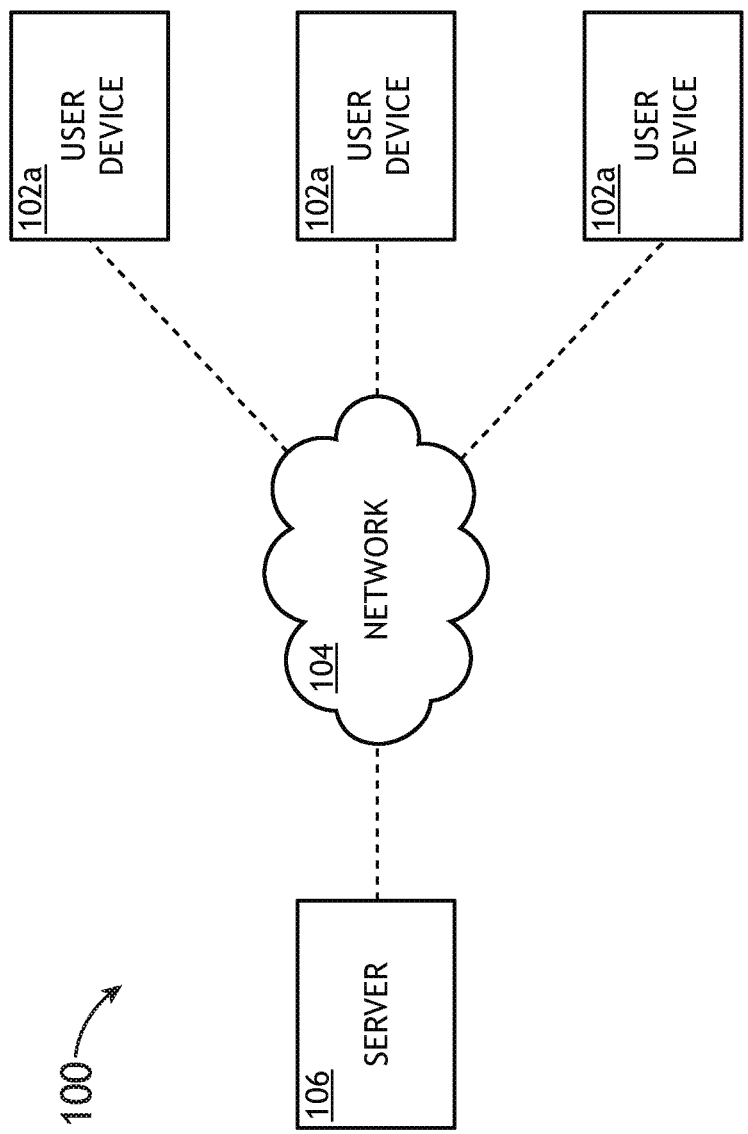

FIG. 3D

TUTORIAL CONTENT CREATION AND INTERACTION SYSTEM

CROSS-REFERENCE TO RELATED APPLICATION

The present application claims the benefit under 35 U.S.C. § 119(e) of U.S. Provisional Application Ser. No. 62/645,622, filed Mar. 20, 2018, entitled TUTORIAL CONTENT CREATION AND INTERACTION SYSTEM, naming Alexander Kuklinski and Daniel Casson as inventors, which is incorporated herein by reference in the entirety.

TECHNICAL FIELD

The present invention generally relates to a system for organizing tutorials, and, in particular, is directed to a platform for creating, finding, viewing, and interacting with tutorials in a manner designed to maximize engagement and retention of tutorial subject matter.

BACKGROUND

For various reasons, including category, format, and number of tutorials available, finding and viewing a tutorial may be a slow and tedious process. Creating a tutorial has also traditionally been a slow process that requires experience in making tutorials to create an engaging tutorial in a time effective manner. The result of these challenges is a decreased number of tutorials being created, and tutorials which are difficult to find and/or view. Therefore, it would be desirable to provide a system and method that cure the shortfalls of the previous approaches identified above.

SUMMARY

A system is disclosed, in accordance with one or more embodiments of the present disclosure. In one embodiment, the system includes a user device including a user interface, wherein the user interface includes a display and a user input device. In another embodiment, the system includes one or more processors, wherein the one or more processors are communicatively coupled to memory. In another embodiment, the one or more processors are configured to execute a set of program instructions maintained in the memory and configured to cause the one or more processors to: receive a video; display a first prompt on the display for entry of a first text entry by a user; receive, from the user input device, the first text entry from the user via the first prompt; display a slidable video segment selection element, wherein the slidable video segment selection element indicates a segment selection of the video; receive, from the user input device, a selection of a first segment of the video via the slidable video segment selection element; display a synchronization soft key; upon a first selection of the synchronization soft key via the user input device, synchronize the first text entry with the first segment of the video; display an additional prompt on the display for entry of an additional text entry by the user; receive, from the user input device, the additional text entry from the user via the additional prompt; receive, from the user input device, a selection of an additional segment of the video via the slidable video segment selection element; upon an additional selection of the synchronization soft key via the user input device, synchronize the additional text entry with the additional segment of the video; and generate a text searchable tutorial based on the synchronization of the first text entry with the first segment of the video and the synchronization of the additional text entry with the additional segment of the video.

A system is disclosed. In one embodiment, the system includes a server including one or more processors and memory, wherein the one or more processors are communicatively coupled to the memory, wherein the server is communicatively couplable to a user device including a user interface, wherein the user interface includes a display and a user input device. In another embodiment, the one or more processors are configured to execute a set of program instructions maintained on the memory and configured to cause the one or more processors to: receive a video; display a first prompt on the display for entry of a first text entry by a user; receive, from the user input device, the first text entry from the user via the first prompt; display a slidable video segment selection bar, wherein the slidable video segment selection bar indicates a segment selection of the video; receive, from the user input device, a selection of a first segment of the video via the slidable video segment selection bar; display a synchronization soft key; upon a first selection of the synchronization key via the user input device, synchronize the first text entry with the first segment of the video; display an additional prompt on the display for entry of an additional text entry by the user; receive, from the user input device, the additional text entry from the user via the additional prompt; receive, from the user input device, a selection of an additional segment of the video via the slidable video segment selection bar; upon an additional selection of the synchronization soft key via the user input device, synchronize the additional text entry with the additional segment of the video; and generate a text searchable tutorial based on the synchronization of the first text entry with the first segment of the video and the synchronization of the additional text entry with the additional segment of the video.

A user device for generating video tutorials is disclosed, in accordance with one or more embodiments of the present disclosure. In one embodiment, the user device includes a display coupled to one or more processors, the display including a graphical user interface generated by the one or more processors. In another embodiment, the graphical user interface includes: a video window configured to display a video; a first prompt and a second prompt, wherein the first prompt and the second prompt include one or more input boxes configured to receive a first text entry and an additional text entry from a user; a slidable video segment selection element configured to receive a first segment selection of the video and an additional segment selection of the video from the user; a synchronization soft key configured to synchronize the first text entry with the first segment selection of the video upon a first selection of the synchronization soft key, and further configured to synchronize the additional text entry with the additional segment selection of the video upon an additional segment selection of the synchronization soft key; and a publication soft key configured to generate a text-searchable tutorial based on the synchronization of the first text entry with the first segment selection of the video and the synchronization of the additional text entry with the additional segment selection of the video.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 1A illustrates a simplified block diagram of a system for creating, finding, and interacting with tutorials, in accordance with one or more embodiments of the present disclosure.

FIG. 3D illustrates a display of a user device depicting a display page showing a generated text-searchable video tutorial, in accordance with one or more embodiments of the present disclosure.

DETAILED DESCRIPTION OF THE INVENTION

Figure 1B:
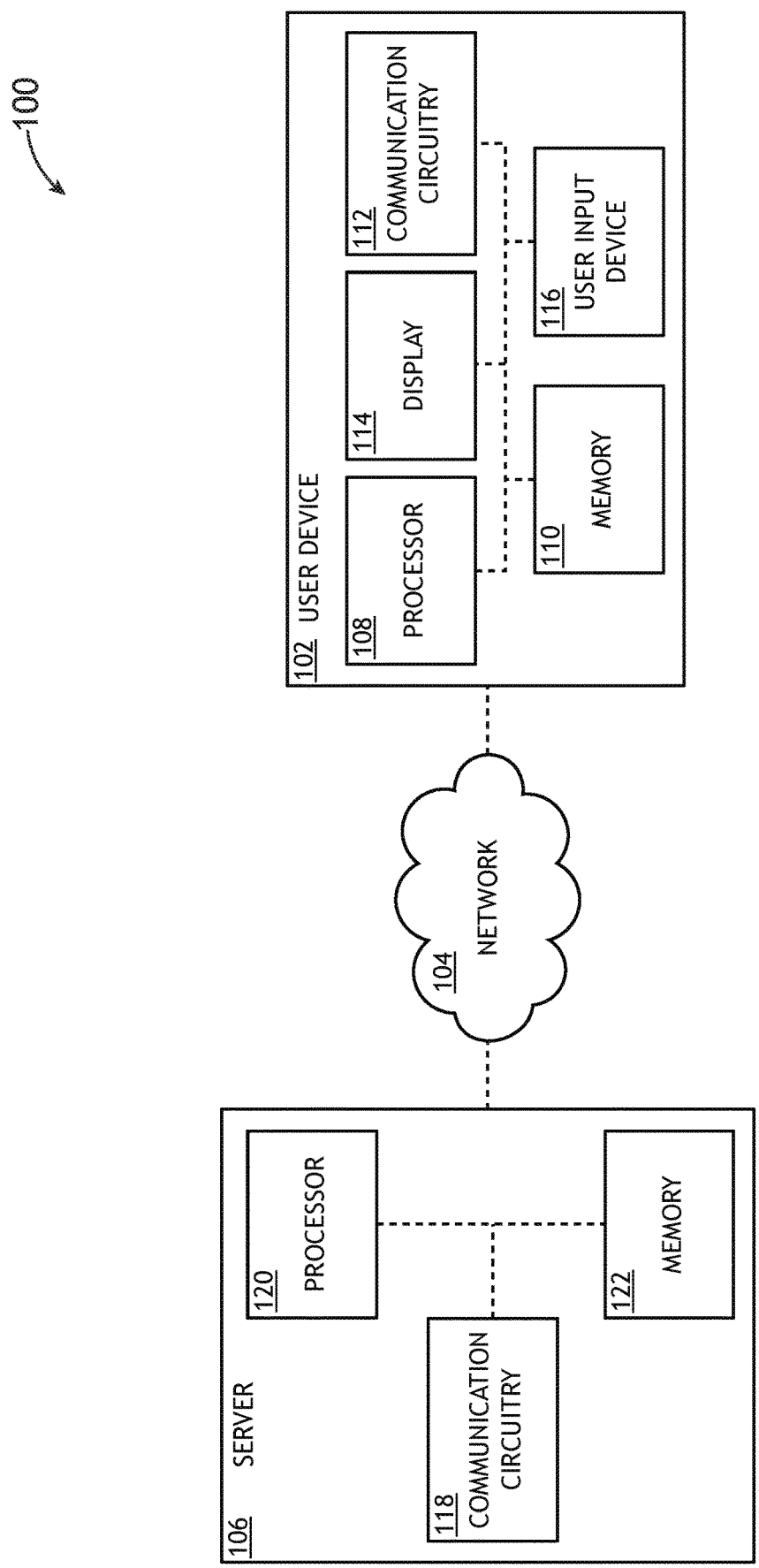
FIG. 1B illustrates a simplified block diagram of a system for creating, finding, and interacting with tutorials, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Broadly, embodiments of the present disclosure are directed to a system and method for creating interactive multimedia tutorials, including video and written tutorials. Additional embodiments of the present disclosure are directed to a system and method for creating video tutorials and associated written tutorials in a manner which maximizes engagement and retention of the tutorial subject matter. In embodiments, the system allows a tutorial to begin from a selected location in the tutorial and also allows a specific tutorial to be opened at a specific location utilizing a bookmark. The system additionally allows creation of a tutorial that includes topics, images, and text. Further embodiments of the present disclosure are directed to a system and method for searching a set of tutorials from content found in a written set of instructions of the video tutorial, transcripts of the video tutorial, or word captions associated with a video tutorial.

The present disclosure relates to locating and interacting with tutorials from a set of tutorials. In one embodiment, a tutorial is located within a set of tutorials by searching for one or more keywords and/or one or more phrases. In another embodiment, a tutorial is located from a set of tutorials by searching for one or more keywords and/or one or more phrases in a set of transcripts, written set of instructions, or word captions of tutorials. In another embodiment, a tutorial is located utilizing a bookmark that records the location of a tutorial. In another embodiment, content is created for a new and/or existing tutorial. In another embodiment, content of an existing tutorial is edited.

The present disclosure further relates to searching for a keyword in a set of tutorials to locate a specific location in one or more tutorials that match the keyword used to search the set of tutorials. For example, one or more keywords or phrases may be utilized to search a set of tutorials. For instance, one or more keywords or phrases may be utilized to search a set of video tutorials, written set of instructions, transcripts, or word captions. As the term is used herein, the term "transcript" may be regarded as referring to automatically generated transcripts of a video tutorial. Open-source programs may highlight and display transcripts adjacent to a video, or additionally and/or alternatively display transcripts as a closed captioning feature overlaid on the video. Comparatively, as the term is used herein, the term "written set of instructions," "written tutorial," or like terms, may be regarded as referring to written tutorial steps manually entered by a user. In one embodiment, a user selects one or more of the tutorials that has a match found by the keyword search. In another embodiment, the user is taken to the beginning of the section or step where a match found by a search of a keyword was located in a selected tutorial. In one embodiment, each video tutorial segment or step includes multimedia or a link to multimedia. In another embodiment, content of video tutorials is searched by performing a search of a written set of instructions of the video tutorial, transcripts, or word captions associated with the video tutorial. In another embodiment, a tutorial starts from the beginning of a step or video segment of a video tutorial where a keyword is found. In another embodiment, a specific tutorial is opened at a specific location utilizing a bookmark. In another embodiment, a tutorial that includes topics, images, and text is created or edited. In another embodiment, a tutorial is embedded in another application. For example, a tutorial may be embedded in a word processing document, presentation, pdf, e-mail, or other electronic application used to communicate information.

It is noted that a search of the set of tutorials includes text analysis and not computer imaging of an image or document. It is additionally noted that the display includes dynamic transitions and does not require a reload or refresh to display new information. It is also noted that the present disclosure may improve the overall learning experience of a user. It is further noted that the present disclosure relates to the improvement of closed captioning. For example, it is contemplated that the present disclosure may improve teaching by improving the highlighting of captioning in real time.

FIG. 1A illustrates a simplified block diagram of a system for creating, finding, and interacting with tutorials, in accordance with one or more embodiments of the present disclosure. The system 100 may include, but is not limited to, one or more user devices 102, a network 104, and one or more servers 106.

In one embodiment, the one or more user devices 102 include displays configured to present data of system 100 to a user. For example, a display of a user device 102 may be configured to display various selectable buttons, selectable elements, text boxes, and the like, in order to carry out the various steps of the present disclosure. In this regard, the one or more user devices 102 may include any user device known in the art for displaying data to a user including, but not limited to, mobile computing devices (e.g., smart phones, tablets, smart watches, and the like), laptop computing devices, desktop computing devices, and the like. By way of another example, the one or more user devices 102 may include one or more touchscreen-enabled devices.

In one embodiment, the display 114 includes a graphical user interface, wherein the graphical user interface includes one or more display pages configured to display and receive data/information to and from a user. In another embodiment, the one or more processors 108, 120 may be configured to generate the graphical user interface of the display 114, wherein the graphical user interface includes the one or more display pages configured to transmit and receive data to and from a user.

In another embodiment, system 100 includes one or more servers 106. It is contemplated herein that the one or more servers 102 may be attributable to one or more users, clients, developers and/or companies. In another embodiment, server 106 is communicatively coupled to the one or more user devices 102 via network a 104. In this regard, the server 106 and/or user devices 102 may include a network interface device and/or communication circuitry suitable for interfacing with network 104. The communication circuitry may include any network interface device known in the art. For instance, the network interface devices may include wireline-based interface devices (e.g., DSL-based interconnection, Cable-based interconnection, T9-based interconnection, and the like). In another instance, the network interface devices may include a wireless-based interface device employing GSM, GPRS, CDMA, EV-DO, EDGE, WiMAX, 3G, 4G, 4G LTE, 5G, Wi-fi protocols, and the like. By way of another example, server 106 may include a cloud based architecture.

The server 106 may be configured to receive and/or acquire data or information from other systems or sub-systems (e.g. a user device 102, one or more additional servers, and/or components of the one or more additional servers) communicatively coupled to the server 106 by a transmission medium that may include wireline and/or wireless portions. The server 106 may additionally be configured to transmit data or information (e.g., the output of one or more procedures of the inventive concepts disclosed herein) to one or more systems or sub-systems communicatively coupled to the server 106 by a transmission medium that may include wireline and/or wireless portions. In this regard, the transmission medium may serve as a data link between the server 106 and the other systems or sub-systems (e.g. a user device 102, one or more additional servers, and/or components of the one or more additional servers) communicatively coupled to the server 106. Additionally, the server 106 may be configured to send data to external systems via a transmission medium (e.g., network connection).

FIG. 1B illustrates a simplified block diagram of a system 100 for creating, finding, and interacting with tutorials, in accordance with one or more embodiments of the present disclosure. As noted previously herein, the system 100 may include, but is not limited to, one or more user devices 102, a network 104, and one or more servers 106.

In one embodiment, a user device 102 may include, but is not limited to, one or more processors 108, a memory 110, and communication circuitry 112. In another embodiment, the user device 102 may include a user interface, wherein the user interface includes a display 114 and a user input device 116.

The display 114 may include any display device known in the art. For example, the display 114 may include, but is not limited to, a liquid crystal display (LCD), an organic light-emitting diode (OLED) based display, a CRT display, and the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user input device (e.g., touchscreen, bezel mounted interface, keyboard, mouse, trackpad, and the like) is suitable for implementation in the present invention.

In another embodiment, the user device 102 includes a user input device 116. The display 114 may be coupled to the user input device 116 by a transmission medium that may include wireline and/or wireless portions. The user input device 116 may include any user input device known in the art. For example, the user input device 116 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface, those skilled in the art should recognize that a large number of touchscreen interfaces may be suitable for implementation in the present invention. For instance, the display 114 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device 116 may include, but is not limited to, a bezel mounted interface.

The communication circuitry 112 of the user device 102 may include any network interface circuitry or network interface device suitable for interfacing with network 104. For example, the communication circuitry 112 may include wireline-based interface devices (e.g., DSL-based interconnection, cable-based interconnection, T9-based interconnection, and the like). In another embodiment, the communication circuitry 116 may include a wireless-based interface device employing GSM, GPRS, CDMA, EV-DO, EDGE, WiMAX, 3G, 4G, 4G LTE, 5G, WiFi protocols, RF, LoRa, and the like.

Similarly, the one or more servers 106 may include communication circuitry 118. The communication circuitry 118 of the server 106 may include any network interface circuitry or network interface device suitable for interfacing with network 104. For example, the communication circuitry 118 may include wireline-based interface devices (e.g., DSL-based interconnection, cable-based interconnection, T9-based interconnection, and the like). In another embodiment, the communication circuitry 116 may include a wireless-based interface device employing GSM, GPRS, CDMA, EV-DO, EDGE, WiMAX, 3G, 4G, 4G LTE, 5G, WiFi protocols, RF, LoRa, and the like.

While the user devices 102 and the one or more servers 106 are shown and described as being communicatively coupled via the network, it is noted herein that this is not to be regarded as a limitation of the present disclosure, unless noted otherwise herein. In this regard, the server 106 may be regarded as a "local" server, in that it may be located proximate to the one or more user devices 102. For example, the one or more user devices 102 may be communicatively coupled to the one or more severs 106 via a wired connection. In an additional and/or alternative embodiment, the one or more servers 106 may be located remotely with respect to the one or more user devices 102.

In one embodiment, the one or more processors 120 of the server 106 may be configured to execute a set of program instructions stored in memory 122, the set of program instructions configured to cause the one or more processors 120 to carry out various steps of the present disclosure. For example, the one or more processors 120 of the server 106 may be configured to transmit videos, data, and the like to the one or more user devices 102. The one or more processors 120 may be configured to transmit videos and/or data to the one or more user devices 102 in response to one or more control signals received from the one or more user devices 102. By way of another example, the one or more servers 106 may be configured to carry out various processing functions of the present disclosure. For example, the server 106 may include a server configured for Software as a Service (SaaS) including, but not limited to, Amazon Web Services.

In another embodiment, the one or more processors 108 of the user devices 102 and/or the one or more processors 120 of the servers 106 may be configured to execute a set of program instructions stored in memory 110, 122, wherein the set of program instructions are configured to cause the one or more processors 108, 120 to carry out the steps of the present disclosure. For example, the one or more processors 108, 120 may be configured to execute a set of program instructions stored in memory 110, 122, wherein the set of program instructions are configured to cause the one or more processors 108, 120 to: receive a video; display a first prompt on the display for entry of a first text entry by a user; receive, from the user input device, the first text entry from the user via the first prompt; display a slidable video segment selection element, wherein the slidable video segment selection element indicates a segment selection of the video; receive, from the user input device, a selection of a first segment of the video via the slidable video segment selection element; display a synchronization soft key; and, upon a first selection of the synchronization soft key via the user input device, synchronize the first text entry with the first segment of the video.

By way of another example, the one or more processors 108, 120 may be configured to execute a set of program instructions stored in memory 110, 122, wherein the set of program instructions are configured to cause the one or more processors 112, 120 to: display an additional prompt on the display for entry of an additional text entry by the user; receive, from the user input device, the additional text entry from the user via the additional prompt; receive, from the user input device, a selection of an additional segment of the video via the slidable video segment selection element; upon an additional selection of the synchronization soft key via the user input device, synchronize the additional text entry with the additional segment of the video; generate a text searchable tutorial based on the synchronization of the first text entry with the first segment of the video and the synchronization of the additional text entry with the additional segment of the video. In another embodiment, the one or more processors 108, 120 may be configured to save the generated text searchable tutorial in a memory 110, 122.

It is noted herein that the one or more components of system 100 may be communicatively coupled to the various other components of system 100 in any manner known in the art. For example, the one or more processors 108, 122 may be communicatively coupled to each other and other components via a wireline (e.g., copper wire, fiber optic cable, and the like) or wireless connection (e.g., RF coupling, IR coupling, data network communication (e.g., 3G, 4G, 4G LTE, 5G, WiFi, WiMax, Bluetooth and the like).

In one embodiment, the one or more processors 108, 120 may include any one or more processing elements known in the art. In this sense, the one or more processors 108, 120 may include any microprocessor-type device configured to execute software algorithms and/or instructions. In one embodiment, the one or more processors 108, 120 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 108, 120. In general, the term "processor" may be broadly defined to encompass any device having one or more processing elements, which execute program instructions from memory 110, 122. Moreover, different subsystems of the system 100 (e.g., user device 102, network 104, server 106) may include processor or logic elements suitable for carrying out at least a portion of the steps described throughout the present disclosure. Therefore, the above description should not be interpreted as a limitation on the present disclosure but merely an illustration.

The memory 110, 122 may include any storage medium known in the art suitable for storing program instructions executable by the associated one or more processors 108, 120. For example, the memory 110, 122 may include a non-transitory memory medium. For instance, the memory 110, 122 may include, but is not limited to, a read-only memory (ROM), a random access memory (RAM), a magnetic or optical memory device (e.g., disk), a magnetic tape, a solid state drive and the like. It is further noted that memory 110, 122 may be housed in a common controller housing with the one or more processors 108, 120. In an alternative embodiment, the memory 110, 122 may be located remotely with respect to the physical location of the processors 108, 120, user device 102, server 106, and the like. For instance, the one or more processors 108, 120 and/or the server 106 may access a remote memory (e.g., server), accessible through a network (e.g., internet, intranet and the like). In another embodiment, the memory 110, 122 maintains program instructions for causing the one or more processors 108, 120 to carry out the various steps described through the present disclosure.

Each of the subsystem(s) or system(s) described herein may take various forms, including a network server, personal computer system, image computer, mainframe computer system, workstation, network appliance, Internet appliance, or other device. In general, the term "system" may be broadly defined to encompass any device having one or more processors, which executes instructions from a memory medium. The subsystem(s) or system(s) may also include any suitable processor known in the art such as a parallel processor. In addition, the subsystem(s) or system(s) may include a computer platform with high speed processing and software, either as a standalone or a networked tool.

If the system includes more than one subsystem, then the different subsystems may be coupled to each other such that images, data, information, instructions, etc. can be sent between the computer subsystems as described further herein. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

It is noted herein that program instructions may be implemented by the one or more processors 108, 120 in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Figure 2A:
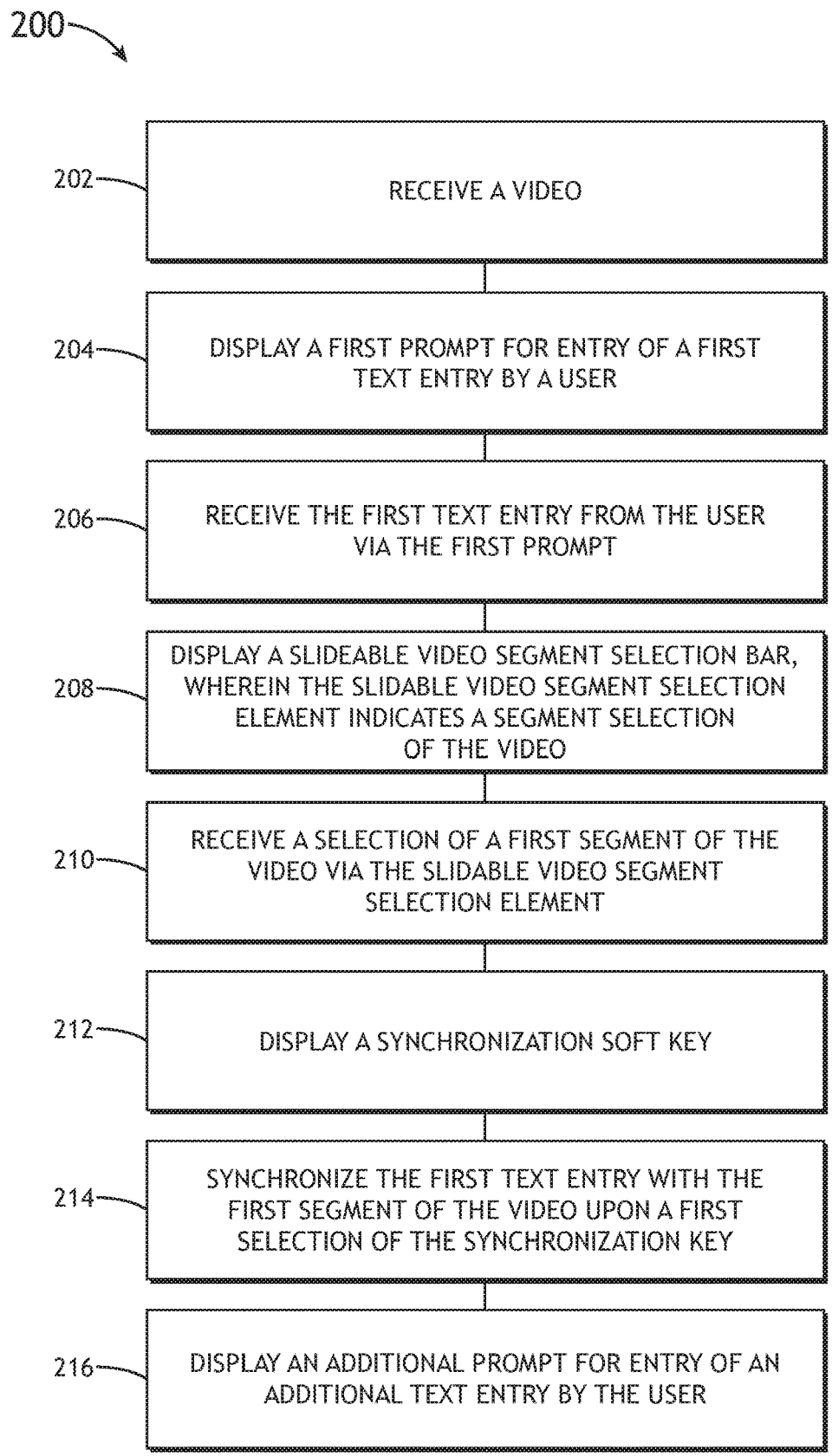
FIG. 2A illustrates a flowchart of a portion of a method for creating tutorials, in accordance with one or more embodiments of the present disclosure.
Figure 2B:
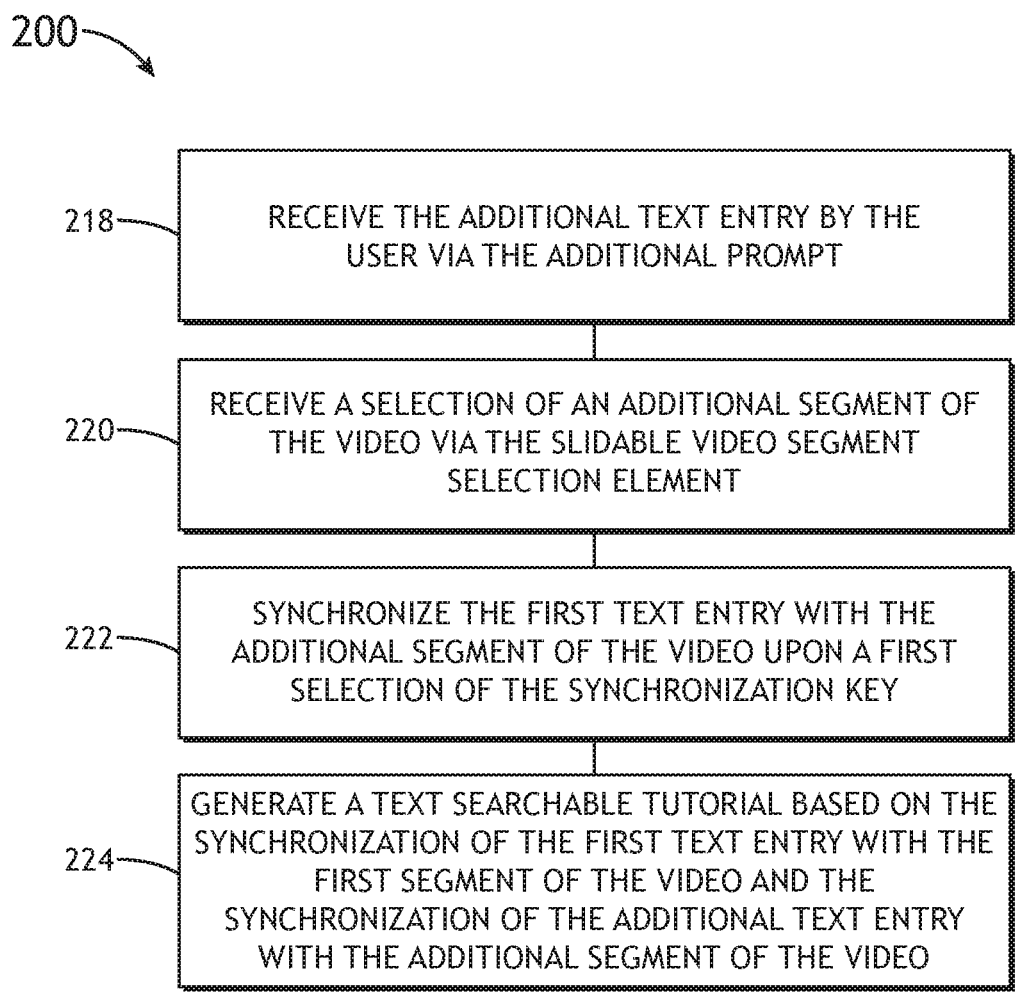
FIG. 2B illustrates a flowchart of a portion of a method for creating tutorials, in accordance with one or more embodiments of the present disclosure.

The various steps and functions carried out by the one or more processors 108 may be further understood with reference to FIGS. 2A-2B. It is noted herein, however, that any functions and/or steps shown and described as being carried out by the one or more processors 108 of the user devices 102 may additionally and/or alternatively be carried out by the one or more processors 120 of the server 106. In this regard, any description of the one or more processors 108 may additionally and/or alternatively be regarded as applying to the one or more processors 120. Similarly, any description of the one or more processors 120 may additionally and/or alternatively be regarded as applying to the one or more processors 108.

FIG. 2A illustrates a flowchart of a method 200 for creating tutorials, in accordance with one or more embodiments of the present disclosure. In particular, method 200 may be used to generate a text-searchable tutorial including a video tutorial and an associated written tutorial. It is noted herein that the steps of method 200 may be implemented all or in part by system 100. It is further recognized, however, that the method 200 is not limited to the system 100 in that additional or alternative system-level embodiments may carry out all or part of the steps of method 200.

Figure 3A:
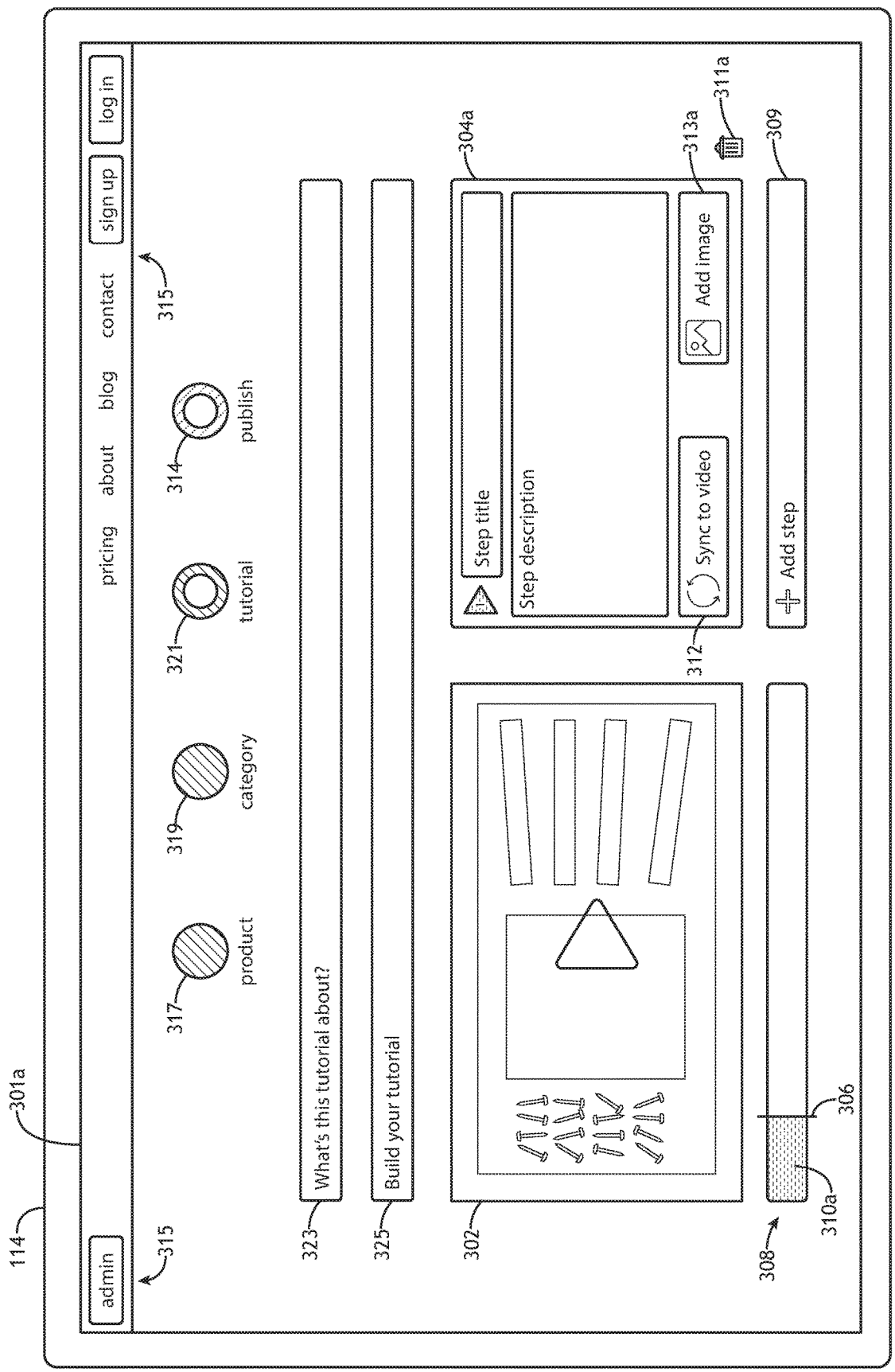
FIG. 3A illustrates a graphical user interface of a display depicting a display page for creating a tutorial, in accordance with one or more embodiments of the present disclosure.

In step 202, a video is received by one or more processors. For example, the one or more processors 108, 120 may receive a video from a server 106 via the network 104. The user device 102 may receive the video in response to one or more input commands received by a user via the user input device 116. For example, FIG. 3A illustrates a graphical user interface of a display 114 depicting a display page 301a for creating a video tutorial, in accordance with one or more embodiments of the present disclosure. As may be seen in FIG. 3A, upon receiving a video, the one or more processors 108, 120 may be configured to generate a graphical user interface including display page 301a configured to display the video in a video window 302.

In a step 204, a first prompt for entry of a first text entry by a user is displayed. For example, the one or more processors 108, 120 may be configured to cause the graphical user interface of the display 114 to display a first prompt 304a for entry of a first text by a user on a display page 301a. As shown in FIG. 3A, the first prompt 304a may include one or more text boxes configured to receive information from a user. For instance, the first prompt 304a may include, but is not limited to, a first input box configured to receive a tutorial step title, a second input box configured to receive a tutorial step description, and the like.

In step 206, a first text entry is received from a user via the first prompt. For example, a user may input a first text entry into the first prompt 304a via the user input device 118. The first text entry may then be received by the one or more processors 108, 112.

In a step 208, a slidable video segment selection element is displayed. In one embodiment, the slidable video segment selection element indicates a selection of the video. For example, the one or more processors 108, 112 may be configured to cause the display 114 of the user device 102 to display a slidable video segment selection element 306 on the display page 301a. In one embodiment, as shown in FIG. 3A, the slidable video segment selection element 306 includes a slidable video segment selection bar. In another embodiment, the slidable video segment selection element 306 (e.g., slidable video segment selection bar 306) is slidable across a video frame sequence bar 308. In this regard, the slidable video segment selection element 306 is configured to allow for viewing and/or selection of one or more frames of the video within video window 302.

In a step 210, a selection of a first segment of the video is received from the user input device via the slidable video segment selection bar. For example, a user may input a selection of a first segment of the video within video window 302 by making a selection of the slidable video segment selection element 306 displayed on the display page 301a via the user input device 116. For instance, a user may use the user input device 116 to slide the slidable video segment selection element 306 in order to select a first segment 310a of the video of video window 302. The first segment 310a of the video may include one or more frames of the video within video window 302. In one embodiment, the first segment 310a may be identified on the video frame sequence bar 308 with a first indicator when the first text entry (e.g., first prompt 304a) is selected and/or viewed. For example, the first segment 310a may be identified on the video frame sequence bar 308 with a first color when the first text entry (e.g., first prompt 304a) is selected and/or viewed. In this regard, the first prompt 304a may be configured to display the first selection 310a and/or the first indicator of the first selection 310a. The selection of a first segment 310a of the video may then be received by the one or more processors 108, 112.

In a step 212, a synchronization soft key is displayed. For example, the one or more processors 108, 120 may be configured to cause the display 114 to display a synchronization soft key 312 on the display page 301a. In one embodiment, the synchronization soft key 312 may be disposed within the first prompt 304a. In an additional and/or alternative embodiment, the synchronization soft key 312 may be disposed within the display page 301a at a location different from the first prompt 304a. In one embodiment, the synchronization soft key 312 is configured to synchronize the first text entry received via the first prompt 304a with the first segment 310a of the video within video window 302.

In a step 214, the first text entry is synchronized with the first segment of the video upon a first selection of the synchronization key. For example, upon a user selection of the synchronization soft key 312, the one or more processors 108, 120 may be configured to synchronize the first text entry received via the first prompt 304a with the first segment 310a of the video 302. In this regard, the first text entry may be effectively "associated with" the first segment 310a of the video 302 such that it is displayed and/or viewable when the video window 302 displays a frame within the first segment 310a. For instance, upon creation of the video tutorial and the associated written tutorial, a first written tutorial step (e.g., first text entry received via the first prompt 304a) may be "associated with" the first segment 310a of the video such that selection of the first written tutorial step may cause the video window 302 to jump to a beginning of the first segment 310a of the video.

In one embodiment, tutorial content is created and synced to a portion of the video tutorial by selecting the synchronization soft key 312. For example, once the synchronization soft key 312 is selected the first text entry of a video tutorial may be synced to the video tutorial for the duration of the first segment 310a.

In one embodiment, display page 301a includes an add-step soft key 309 configured to add one or more steps to the video tutorial. For example, upon a user selection of the add-step soft key 309, the one or more processors 108, 120 may be configured to display an additional prompt (e.g., additional prompt 304b shown in FIG. 3B) to receive an additional text entry for an additional video tutorial step. Conversely, display pages 301 may additionally include one or more soft keys 311a, 311b configured to delete one or more video tutorial steps.

In a step 216, an additional prompt for entry of an additional text entry by a user is displayed. For example, the one or more processors 108, 112 may be configured to cause the display 118 of a user interface of the user device 102 to display an additional prompt 304b for entry of an additional text by a user.

Figure 3B:
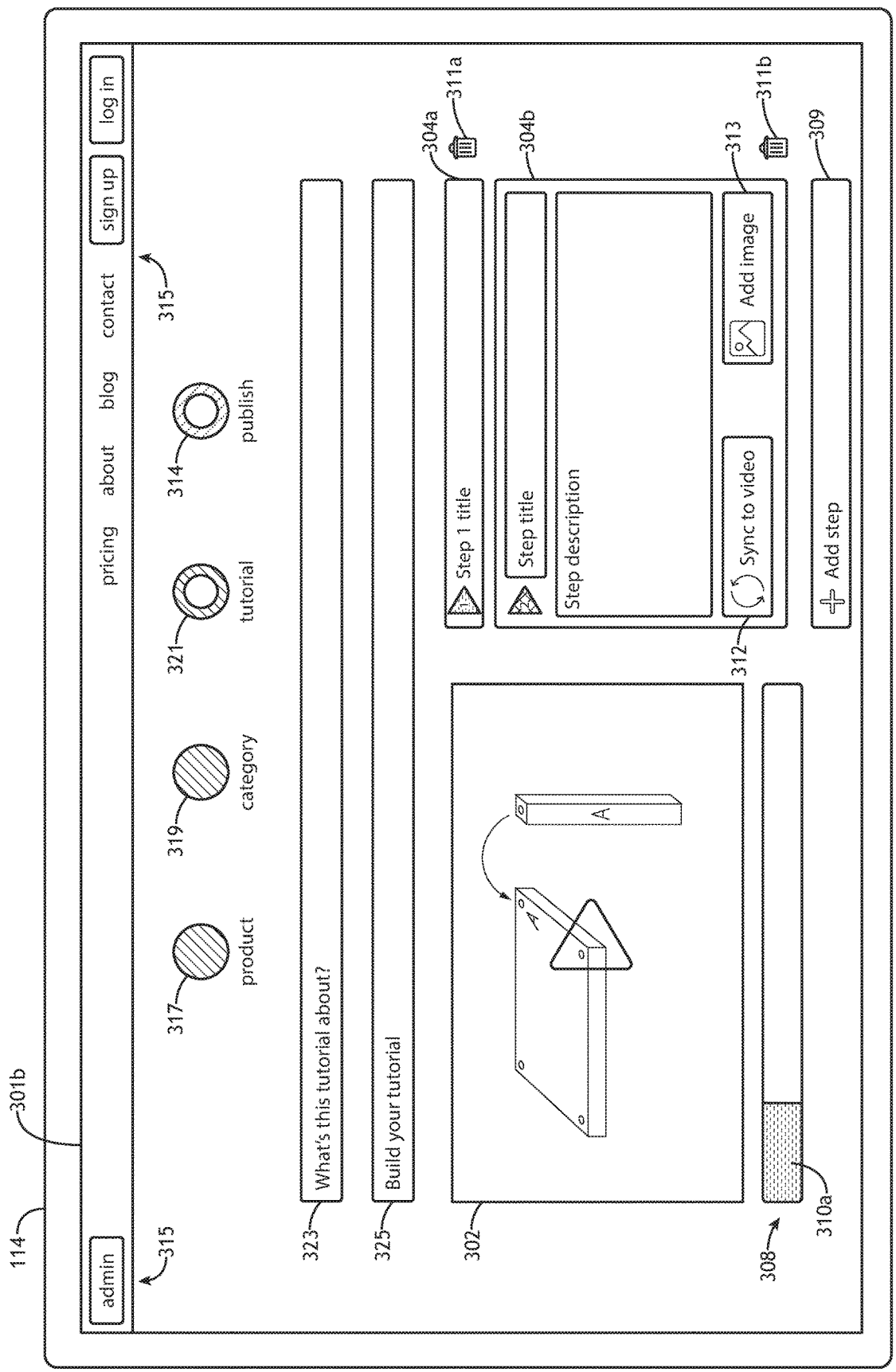
FIG. 3B illustrates a display of a user device depicting a display page for creating a video tutorial, in accordance with one or more embodiments of the present disclosure.

In step 218, an additional text entry is received from a user via the additional prompt. For example, FIG. 3B illustrates a display 114 of a user device 102 depicting a display page 301b for creating a video tutorial, in accordance with one or more embodiments of the present disclosure. As shown in FIG. 3B, the one or more processors 108, 120 may be configured to cause the display 114 to display an additional prompt 304b on the display page 301b. A user may input an additional text entry into the additional prompt 304b via the user input device 116. The one or more processors 108, 120 may then be configured to receive the additional text entry.

Figure 3C:
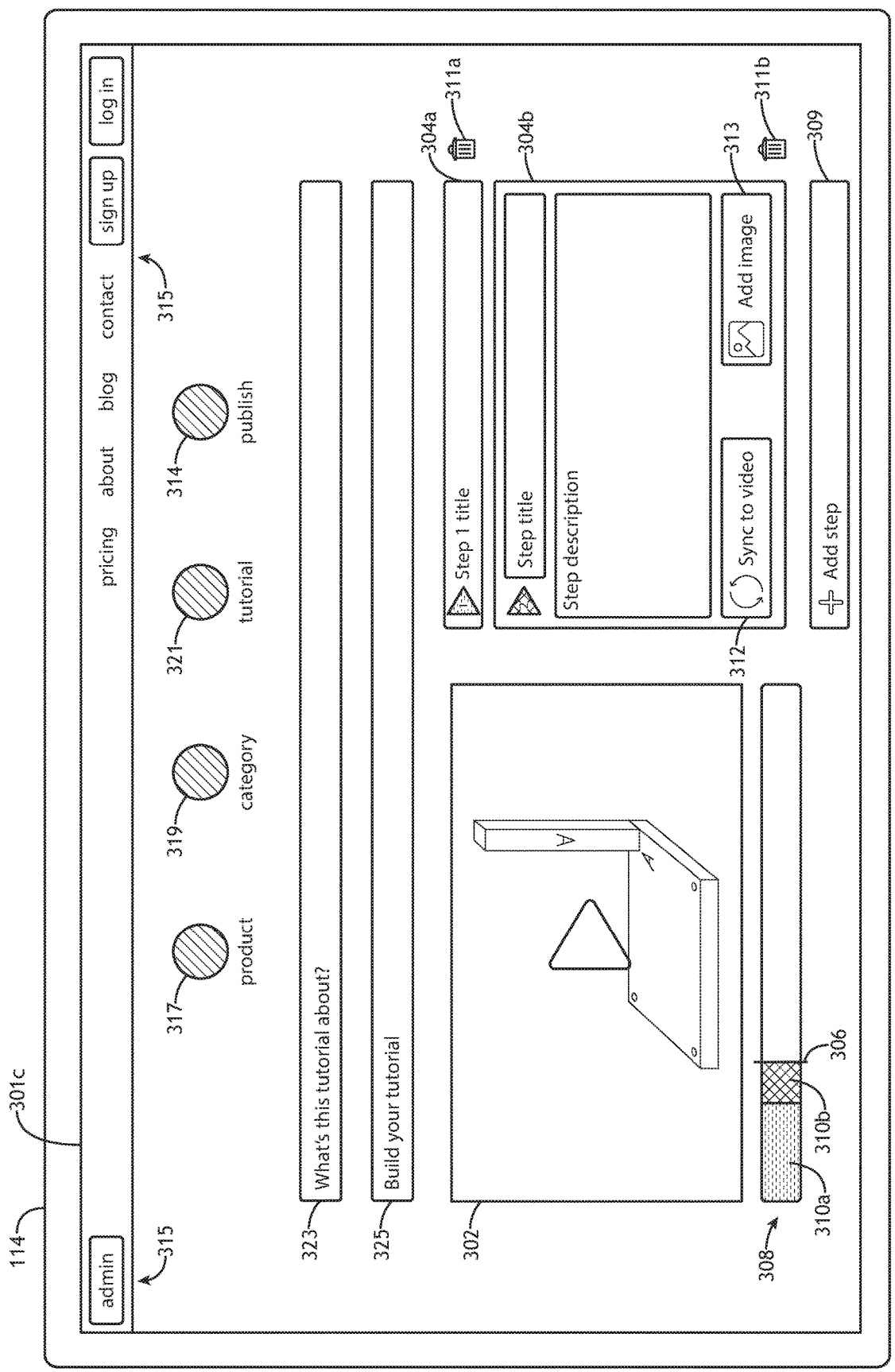
FIG. 3C illustrates a display of a user device depicting a display page for creating a video tutorial, in accordance with one or more embodiments of the present disclosure.

In a step 220, a selection of an additional segment of the video is received from the user input device via the slidable video segment selection bar. For example, FIG. 3C illustrates a display 114 of a user device 102 depicting a display page 301c for creating a video tutorial, in accordance with one or more embodiments of the present disclosure. As shown in FIG. 3C, a user may input a selection of an additional segment 310b of the video by making a selection of the slidable video segment selection element 306 via the user input device 116.

For example, a user may use the user input device 116 to slide the slidable video segment selection element 306 in order to select an additional segment 310b of the video within video window 302. The additional segment 310b of the video 302 may include one or more frames of the video. In one embodiment, the additional segment 310b may be identified on the video frame sequence bar 308 with an additional indicator different from the first indicator when the additional text entry (e.g., additional prompt 304b) is selected and/or viewed. For instance, the additional segment 310b may be identified on the video frame sequence bar 308 with an additional color different from the first color when the additional text entry (e.g., additional prompt 304b) is selected and/or viewed. In this regard, the additional prompt 304b may be configured to display the additional selection 310b and/or the additional indicator of the additional selection 310b. The selection of the additional segment 310b of the video of video window 302 may then be received by the one or more processors 108, 120.

In a step 222, the additional text entry is synchronized with the additional segment of the video upon an additional selection of the synchronization soft key. For example, upon a user selection of the synchronization soft key 312 displayed on the display page 301c, the one or more processors 108, 120 may be configured to synchronize the additional text entry received via the additional prompt 304b with the additional segment 310b of the video. In this regard, the additional text entry may be effectively "associated with" the additional segment 310b of the video 302 such that it is displayed and/or viewable when the video window 302 displays a frame within the additional segment 310b. For instance, upon creation of the video tutorial and the associated written tutorial, an additional written tutorial step (e.g., additional text entry received via the additional prompt 304b) may be "associated with" the additional segment 310b of the video such that selection of the additional written tutorial step may cause the video window 302 to jump to a beginning of the additional segment 310b of the video.

In another embodiment, video segments 310 are gray except for the video segment 310 that is associated with the current tutorial step being edited. For example, when the second prompt 304a is being viewed (e.g., the second video tutorial step is being edited), the second segment 310b may be indicated with the second indicator (e.g., second color), while the other segments 310 are grayed out. In another embodiment, the current topic segment 310 is expanded to display information about the content of the current segment. In another embodiment, a timeline indicating the location of the present image in the video tutorial with respect to time is displayed. For example, the video frame sequence bar 308 may include a frame indicator (e.g., line or the like) which indicates which frame of the video 302 is currently being viewed. In another embodiment, a user can view the tutorial and navigate to a specific location within the tutorial by grabbing and sliding the frame indicator.

In a step 224, a text searchable tutorial is generated based on the synchronization of the first text entry with the first segment of the video and the synchronization of the additional text entry with the additional segment of the video. For example, as shown in FIG. 3C, the display page 301c may include a publication soft key 314 configured to generate a text-searchable video tutorial. Upon selection of the publication soft key 314 via the user input device 116, the one or more processors 108, 120 may be configured to generate a text-searchable tutorial based on the synchronization of the first text entry with the first segment of the video and the synchronization of the additional text entry with the additional segment of the video.

In another embodiment, the one or more processors 108, 120 may be configured to save the generated text-searchable tutorial in a memory 110, 122. For example, the one or more processors 108, 120 may be configured to save generated tutorials in a memory 122 of an AWS server (e.g., server 106) in order to create a database of tutorials stored within memory 122. In this regard, it is contemplated herein that users (via user devices 102) may be able to view, search, and/or edit tutorials stored in a tutorial database maintained in memory 122.

In one embodiment, users may be able to share tutorials generated and saved in memory 110, 122. Generated tutorials may be shared using any sharing techniques known in the art including, but not limited to, shared URLs, embedded codes, selectable links, and the like. URLs, embedded codes, selectable links, and the like, may be shared via any communications technique known in the art including, but not limited to, emails, text messages, "application" messages, and the like.

For example, a user may input one or more input commands via user input device 116*a* of a first user device 102*a*, wherein the one or more input commands are continued to cause the one or more processors 108*a* to transmit a selectable video link associated with a tutorial stored in memory 122 to a second user device 102*b*. Upon selection of the selectable video link, the one or more processors 108*b* of the second user device 102*b* may be configured to retrieve the tutorial associated with the selectable video link from the memory 122. It is further contemplated herein that a user may be able to direct other users to particular portions of a tutorial. For instance, continuing with the same example, the set of input commands may be configured to cause the one or more processors 108 to associate the selectable video link with an additional segment 310*a* of the associated tutorial. In this regard, upon selection of the selectable video link, the one or more processors 108*b* of the second user device 102*b* may be configured to retrieve the tutorial associated with the selectable video and begin the tutorial at a beginning of the additional segment 310*a*.

The ability to generate, share, and retrieve tutorials may be applied in a number of varying contexts. For example, a manager at a company which provides software services may generate a number of tutorials designed to assist employees in carrying out their job functions. For example, the manager may generate a first tutorial which explains a billing feature of the software, a second tutorial which explains a user registration feature of the software, and a third tutorial which explains how to pitch the software to potential clients. Each of these tutorials may be saved in memory 110, 122. Additionally, the manager may be able to embed links to each of the tutorials on an "employee handbook" website, which the employees may be able to access and retrieve/view the generated tutorials. Additionally and/or alternatively, selectable links may be transmitted to employees via email which are configured to direct the employees to a file containing the generated tutorials stored in memory 110, 122.

Figure 3D:
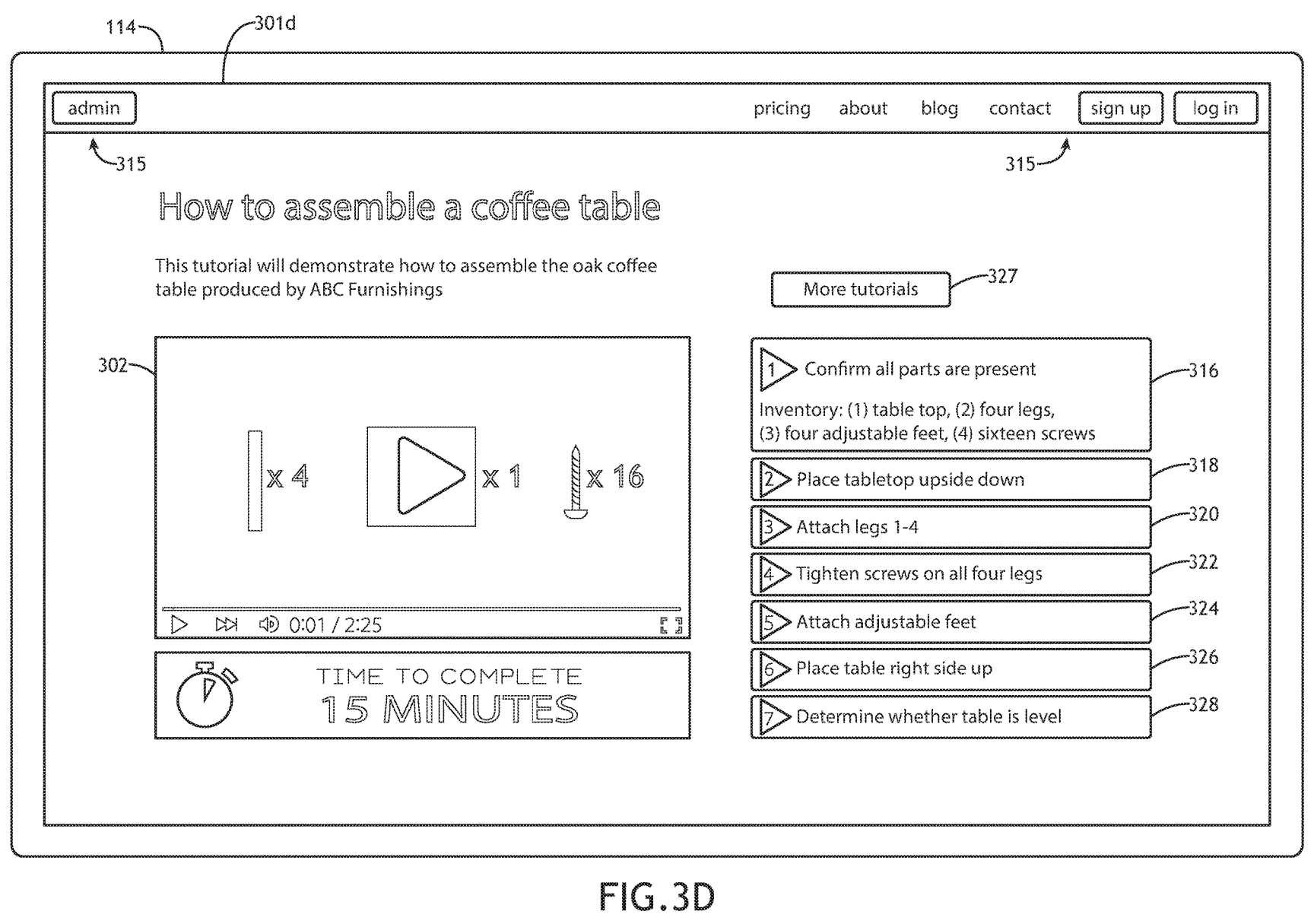

FIG. 3D illustrates a display 114 of a user device 102 depicting a display page 301*d* showing a generated text-searchable tutorial, in accordance with one or more embodiments of the present disclosure. More particularly, display page 301*d* illustrates elements of a generated text-searchable video tutorial for assembling a coffee table.

As shown in FIG. 3D, a text searchable tutorial may be generated and displayed on a display page 301*d*. In one embodiment, a text searchable tutorial may include a video tutorial displayed in the video window 302, as well as an associated written tutorial (e.g., text inputs received via prompts 304), which is depicted as a series of written tutorial steps and represented as a series of include one or more soft key 316, 318, 320, 322, 324, 326, 328. It is noted herein that the creation of a text-searchable tutorial which may be configured to display both a video tutorial as well as an associated written tutorial may serve to facilitate more efficient and effective learning.

In one embodiment, the text-searchable video tutorial displayed on display page 301*d* may include one or more soft key 316, 318, 320, 322, 324, 326, 328, which correspond to the various steps input via prompts 304. For instance, soft button 316 may be associated with the first text entry received via the first prompt 304*a* such that selection of the soft button 316 takes a viewer of the text-searchable video tutorial to the first segment 310*a* associated with the first text entry. In this regard, the first soft key 316 may be associated with a first text entry (e.g., first tutorial step), the second soft key 318 may be associated with a second text entry (e.g., second tutorial step), and the like. For instance, selection of soft key 316 may cause the one or more processors 108, 120 to expand the soft key 316 in order to display details associated with the first tutorial step (e.g., "Confirm all parts are present"). In another embodiment, display page 301*d* includes a soft key 327 configured to display additional/alternative text-searchable video tutorials. For example, selection of the soft key 327 may be configured to cause the graphical user interface of the display 114 of the user device 102 to display a list of generated tutorials stored within memory 122.

In another embodiment, the one or more processors 108, 120 may be configured to display a text entry associated with a tutorial step/soft key upon a user selection of a soft key. For example, as shown in FIG. 3D, upon a user selection of the first soft key 316, the one or more processors 108, 120 may be configured to expand the first soft key 316 and display the first text entry associated with the first prompt 304*a* and the first soft key 316.

As noted previously herein, each tutorial step (represented by soft keys 316, 318, 320, 322, 324, 326, 328, 330) of the written tutorial may be effectively synchronized with particular segments 310 of the video tutorial (represented within video window 302). By way of example, a user device 102 may retrieve a text-searchable tutorial from memory 122 and display the video tutorial and the written tutorial of the text-searchable tutorial on the display 114, wherein the video tutorial of the text-searchable tutorial is displayed in the video window 302, and the written tutorial of the text-searchable tutorial is displayed as a series of one or more written tutorial steps (represented by soft keys 316, 318, 320, 322, 324, 326, 328, 330). As the user views the video of the video tutorial, the one or more processors 108, 120 may be configured to transmit signals to the user device on a regular or irregular basis, wherein the signals are configured to direct the user device 102 to display a written tutorial step associated with the portion of the video being played. For instance, the one or more processors 120 may be configured to transmit a signal for every frame of the video tutorial displayed in the video window 302, wherein the signals instruct the user device 102 to display the step of the written tutorial associated with each particular frame. In this regard, the one or more processors 120, 108 may be configured to cause the display 114 to simultaneously display steps of a written tutorial which are associated with portions and/or frames of the video tutorial currently being viewed.

Figure 3E:
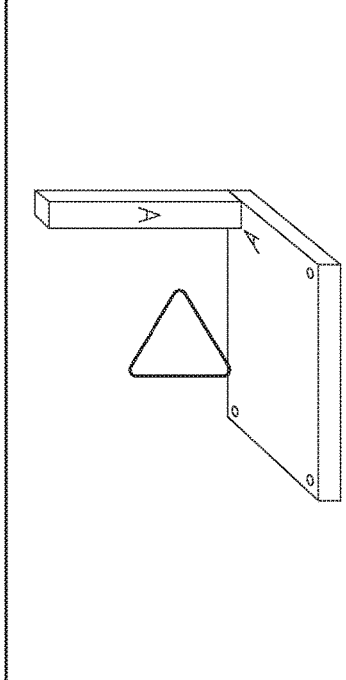
FIG. 3E illustrates a display of a user device depicting a display page showing a generated text-searchable video tutorial, in accordance with one or more embodiments of the present disclosure.

FIG. 3E illustrates a display 114 of a user device 102 depicting a display page 301e showing a generated text-searchable tutorial, in accordance with one or more embodiments of the present disclosure. More particularly, display page 301d illustrates elements of a generated text-searchable tutorial for assembling a coffee table, in accordance with one or more embodiments of the present disclosure.

As noted previously herein, the text-searchable video tutorial may include one or more soft keys 324, 326, 328, 330 associated with one or more video tutorial steps and/or one or more text entries. For example, the one or more processors 108, 120 may be configured to display a text entry associated with a tutorial step/soft key upon a user selection of a soft key. For instance, as shown in FIG. 3E, upon a user selection of the soft key 324, the one or more processors 108, 120 may be configured to expand the soft key 324 and display the text entry associated with the soft key 324.

In another embodiment, the display page 301a includes a menu made up of one or more menu soft buttons 315. For example, the one or more menu soft buttons 315 may include, but are not limited to, an "Admin" soft button, a "Pricing" soft button, an "About" soft button, a "blog" soft button, a "contact" soft button, a "Sign up" soft button, and a "Log in" soft button.

In another embodiment, display page 301a may include one or more soft buttons configured to assist a user to create/author a text-searchable video tutorial. For example, display page 301a may include a soft button 317 configured to allow a user to select a particular product for which the video tutorial will be associated. By way of another example, display page 301a may include a soft button 319 configured to allow a user to select a category for which the video tutorial will be included. By way of another example, display page 301a may include a soft button 321 configured to allow a user to create and/or add content for the tutorial including, but not limited to, uploading a video and/or tutorial, add a tutorial description, add a tutorial title, and add a tutorial duration. For instance, selection of soft button 321 may be configured to display text box 323 and text box 325 configured to receive text inputs from a user for a tutorial title, tutorial description, and the like.

In some embodiments, various portions of display screens 301a-301e may be configured to occupy only a portion of a display 114 of a user device 102. In this regard, it is contemplated herein that a generated text searchable tutorial (including a video tutorial and a written tutorial) may be displayed alongside content which may be associated with the tutorial. For example, consider a website for a financial institution, Bank A. Oftentimes, Bank A will have a selectable link for a tutorial explaining how to reset their password on a sign-in webpage of Bank A's website. Using currently available systems and methods, selection of the selectable link will open a new tab in the user's web browser, where the user may view the tutorial on how to reset their password for Bank A. After viewing the tutorial, the user may then return to the sign-in webpage and carry out the steps of the tutorial. In the event the user forgets one of the steps, the user may be forced to flip back and forth between tabs for the tutorial and sign-in webpage within the web browser.

Now, consider this same example using embodiments of the system and method disclosed herein. Upon selection of the selectable link on Bank A's sign-in display page, the one or more processors 108 of the user device 102 may be configured to retrieve a tutorial for resetting their password from memory 122 of server 106. Additionally, the one or more processors 108 may be configured to display the tutorial (including the video tutorial and the written tutorial) in a same display page 301 of the user device 102, such that the sign-in webpage, video window 302, soft keys 316, 318, 320, 322, 324, 326, 328, 330, and the like, are all simultaneously displayed within the display page 301. It is contemplated herein that simultaneously displaying a tutorial (e.g., video tutorial and/or written tutorial) alongside content related to the tutorial may allow a user to more efficiently and effectively carry out the steps of the tutorial.

Figure 4:
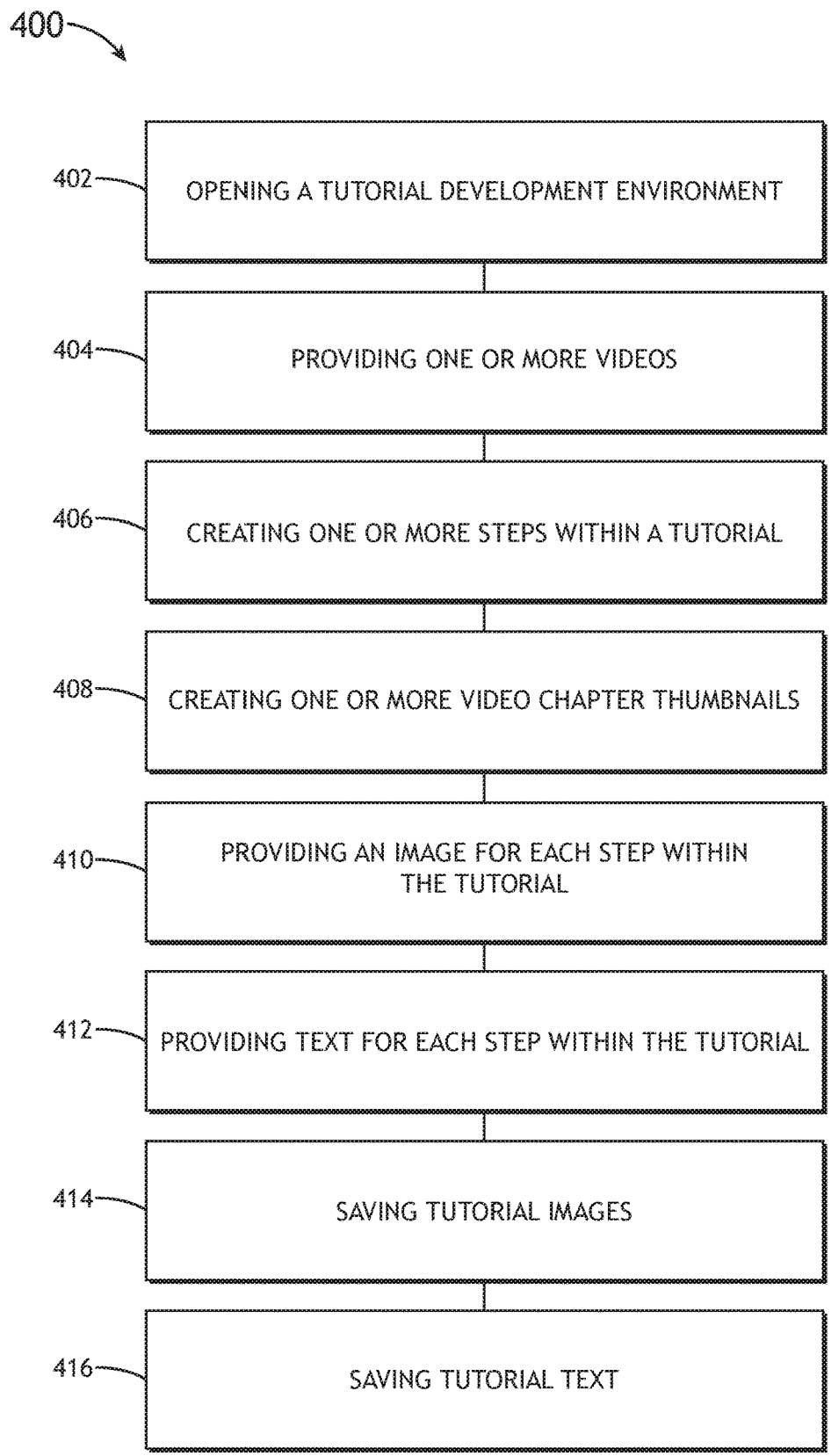
FIG. 4 illustrates a method of creating and/or editing content in a tutorial, in accordance with one or more embodiments of the present disclosure.

FIG. 4 generally illustrates a method 400 of creating and/or editing content in a tutorial, in accordance with one or more embodiments of the present disclosure. It is noted herein that the steps of method 400 may be implemented all or in part by system 100. It is further recognized, however, that the method 400 is not limited to the system 100 in that additional or alternative system-level embodiments may carry out all or part of the steps of method 400.

As noted previously herein, some embodiments of the present disclosure are directed to uploading text and/or images for one or more topics to create a new video tutorial, and/or uploading text and/or images for one or more topics to edit an existing video tutorial.

In a step 402, a tutorial development environment is opened. Opening a tutorial development environment may be father understood with reference to FIG. 5.

Figure 5:
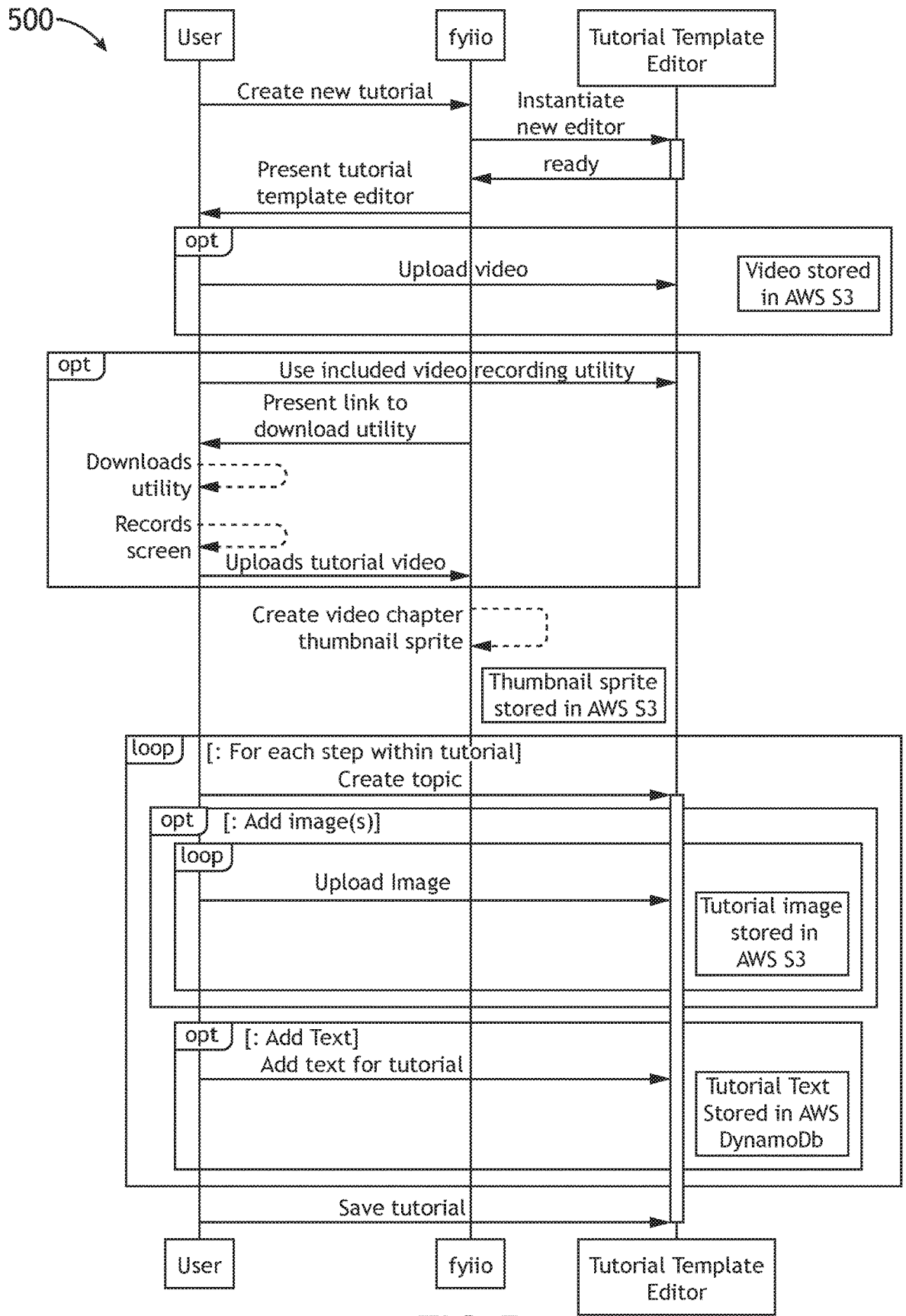
FIG. 5 illustrates a flowchart for authoring new or existing video tutorials, in accordance with one or more embodiments of the present disclosure.

FIG. 5 illustrates a flowchart 500 for authoring new or existing video tutorials, in accordance with one or more embodiments of the present disclosure. As shown in FIG. 5, in step 402, a user may input one or more input commands via user device 102, and may receive a tutorial template editor. For example, a tutorial template editor may be presented to the user via display pages 301 on display 114 of the user device 102, as shown and described previously herein.

In a step 404, one or more videos are provided. For example, as shown in FIG. 5, a user may upload one or more videos. For instance, a user may input one or more input commands configured to cause the user device 102 to receive one or more videos from the server 106. In this regard, the one or more videos may be stored on a remote server including, but not limited to, Amazon Web Services servers.

In a step 406, one or more steps are created within a tutorial. For example, as noted previously herein, a user may input one or more text entries via one or more prompts 304 in order to create one or more written tutorial steps.

In a step 408, one or more video chapter thumbnail sprites are created. In one embodiment, as shown in FIG. 5, the one or more video chapter thumbnail sprites are stored using Amazon Web Services.

In a step 410, an image for each step within the tutorial may be provided. For example, as shown in FIG. 5, an image may be uploaded for each written tutorial step via the image selection soft key 313 of the tutorial template editor shown in display pages 301. It is contemplated herein that selection of the image selection soft key 313 may allow for the addition of images from any number of sources including, but not limited to, memory 110, a server (e.g., server 106), a thumb drive the internet, or the like. It is noted herein that the addition of images to be included within the video tutorial is not a requirement of the method 400. In another embodiment, a user may utilize a utility to record a screen.

For example, as shown in FIG. 5, a user may download a utility that allows the user to record a display shown on a screen (e.g., display 114, or the like) for later upload.

In a step 412, text for each step within a tutorial is provided. For example, as shown in FIG. 5 and described previously herein, a user may input text inputs via prompts 304 for each tutorial step. By way of another example, a file containing text located at a memory (e.g., memory 110) may be uploaded and included within one or more video tutorial steps.

In a step 414, images in a tutorial are saved. For example, an auto save function saves the images in the tutorial. By way of another example, images in a tutorial are stored using Amazon Web Services. For instance, images in a tutorial are stored using Amazon S3 (AWS S3).

In a step 416, the text in a tutorial is saved. For example, text in a tutorial may be stored using Amazon Web Services. For instance, text in a tutorial is saved using Amazon DynamoDB (AWS DynamoDB).

Figure 6:
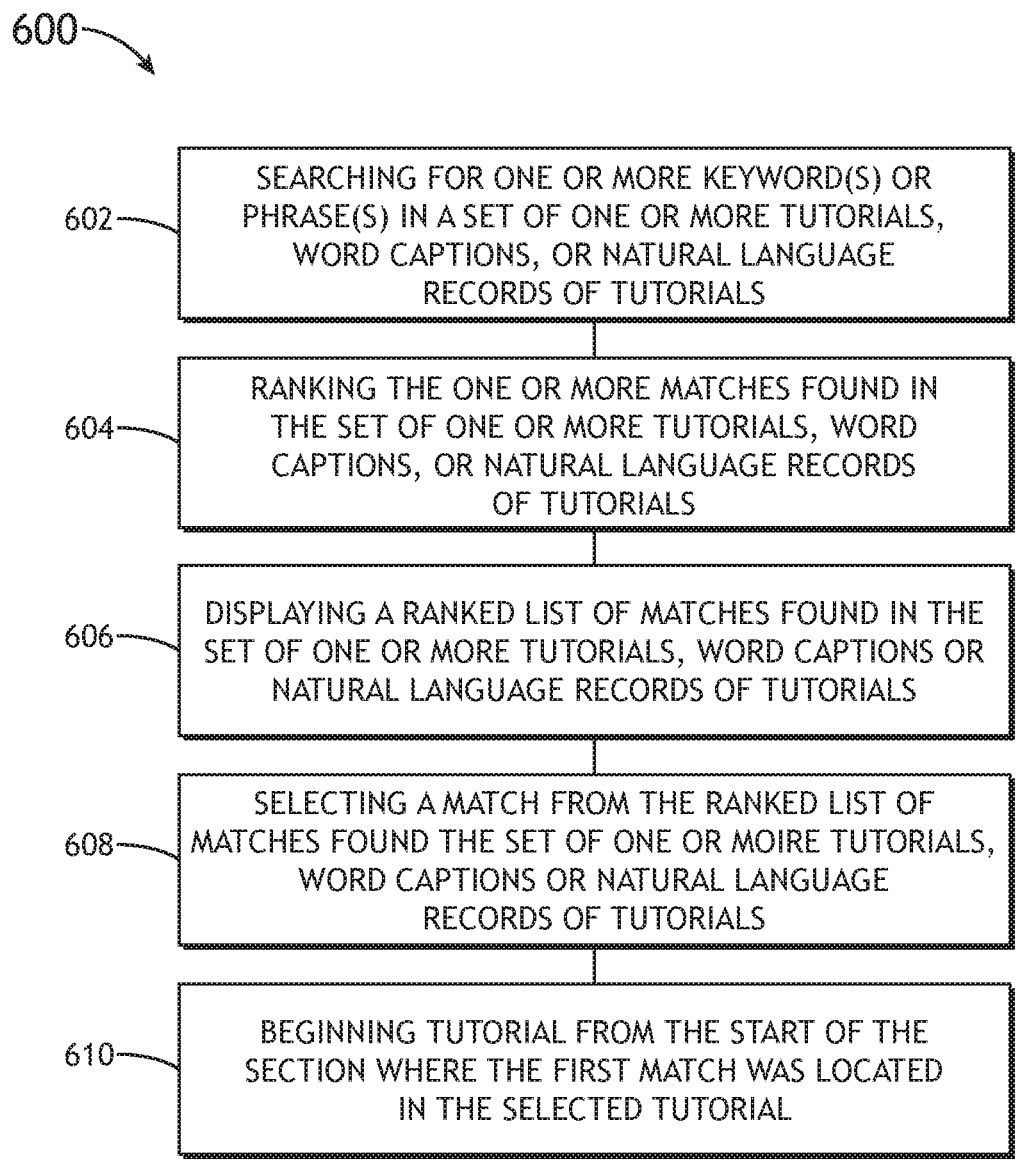
FIG. 6 illustrates a method of selecting a tutorial from a set of tutorials, in accordance with one or more embodiments of the present disclosure.

FIG. 6 generally illustrates a method 600 for selecting a tutorial from a set of tutorials, in accordance with one or more embodiments of the present disclosure. It is noted herein that the steps of method 600 may be implemented all or in part by system 100. It is further recognized, however, that the method 600 is not limited to the system 100 in that additional or alternative system-level embodiments may carry out all or part of the steps of method 600. In one embodiment, the method 600 includes steps to search a list of tutorials and locate a tutorial to provide instruction.

In a step 602, a search is performed to identify a tutorial of interest. For example, a user may input one or more input commands via user input device 116 of a user device, wherein the one or more input commands are configured to cause the one or more processors 108, 120 to search a database of tutorials text-searchable tutorials stored in memory 110, 122. Searching and identifying tutorials may be further understood with reference to FIG. 7.

Figure 7:
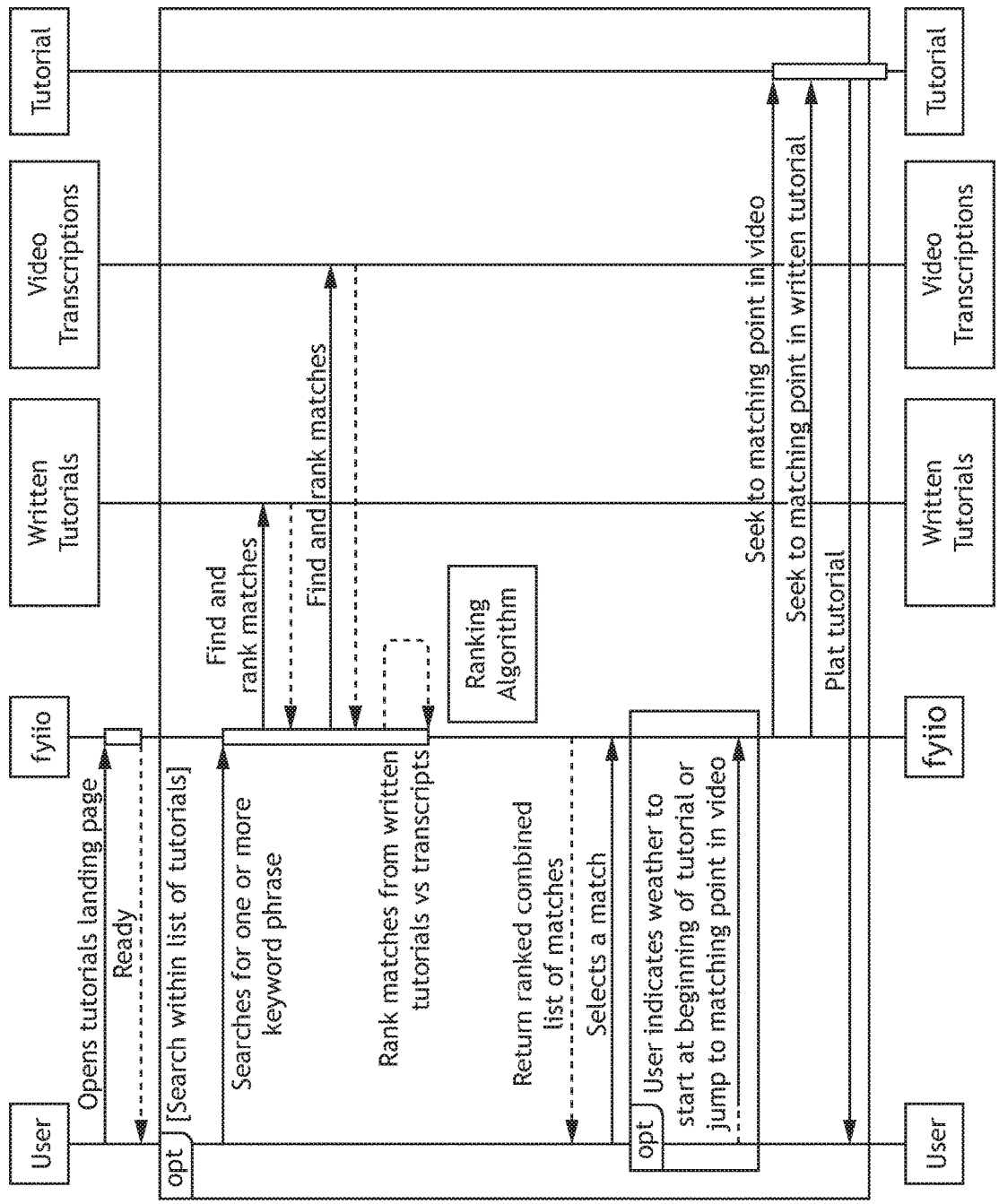
FIG. 7 illustrates a flowchart for selecting a tutorial from a set of tutorials, in accordance with one or more embodiments of the present disclosure.

FIG. 7 illustrates a flowchart for selecting a tutorial from a set of tutorials, in accordance with one or more embodiments of the present disclosure. As shown in FIG. 7, a user may input one or more control commands to open a tutorials landing page, wherein the tutorials landing page includes a list of one or more tutorials. The tutorials landing page may be displayed on a display page 301 on the display of the user device 102. As described in step 602 and shown in FIG. 7, the user may perform a search within tutorials landing page including a list of one or more tutorials. For example, one or more keywords or phrases may be utilized in a search of a set of tutorials, word captions, transcripts, or written tutorials. For instance, one or more keywords or phrases may be utilized in a search of a set of word captions, transcripts, or written set of instructions from a set of video tutorials. In one embodiment, text information is associated with a caption image. For example, a search function may have access to text information at the top of a caption image. By way of another example, snippets may be associated with or imbedded in a video. For instance, gedit snippets may be utilized in a video.

In a step 604, one or more matches corresponding to the search are ranked. For example, as shown in FIG. 7, matches may be found within the written tutorials, word captions, video transcripts, and the like. Matches to the one or more searches may be ranked according to any metric known in the art including, but not limited to, relevance. For example, the matches found in the set of tutorials may be ranked based on the proximity of an occurrence of a keyword of phrase to a location in the tutorial. For instance, the matches found in the set of written tutorials may be ranked based on the proximity of an occurrence of a keyword of phrase to the beginning of the tutorial. By way of another example, a weighted ranking of more than one factor may be used. It is noted herein that the ranking method may be any ranking method know in the art for ranking search results. For example, the matches may be ranked according to any ranking algorithm known in the art.

In a step 606, the ranked list is displayed. For example, as shown in FIG. 7, a ranked list of matches found in the set of one or more tutorials, word captions, transcripts, or written set of instructions of tutorials may be transmitted to the user device 102 and displayed in a display screen 301 of the display 114.

In a step, 608 a match from the ranked list of matches is selected. For example, a tutorial may be selected from a list of tutorials found by performing a keyword search of a set of tutorials. For instance, a ranked list may be generated by performing a keyword search of a set of tutorials and include any number of tutorials from which a user may select a single tutorial by clicking on a link associated with the tutorial. A user may select a match by inputting one or more input commands via the user input device 110.

In a step 610, the selected tutorial starts at the beginning of the section or step where the first match to the keyword search was located in the selected tutorial. In an additional and/or alternative embodiment, as shown in FIG. 7, a user may input one or more input commands to view the tutorial at the beginning of the video. In one embodiment, a user selects a single tutorial by clicking on a link associated with the tutorial and the selected video tutorial starts at the beginning of the section where the first keyword match was found in the video tutorial. For example, if a match to a keyword search was found at the end of a "Step 5" and in the middle of a "Step 8" in a selected tutorial the tutorial would begin at the beginning of "Step 5." By way of another example, if a match to a keyword search was found at the beginning of a "Step 3" of a selected tutorial the tutorial would begin at the beginning of "Step 3." For instance, a user may perform a keyword search of a set of tutorials using the phrase "remove lug nuts" and have a list containing four tutorials displayed. In this instance, a user may read the titles of the four tutorials and select one of the tutorials. In this instance, the phrase "remove lug nuts" may have occurred six times in three different sections of the tutorial, so when a user selects this tutorial the tutorial will start at the beginning of the section where "remove lug nuts" first occurred.

Figure 8:
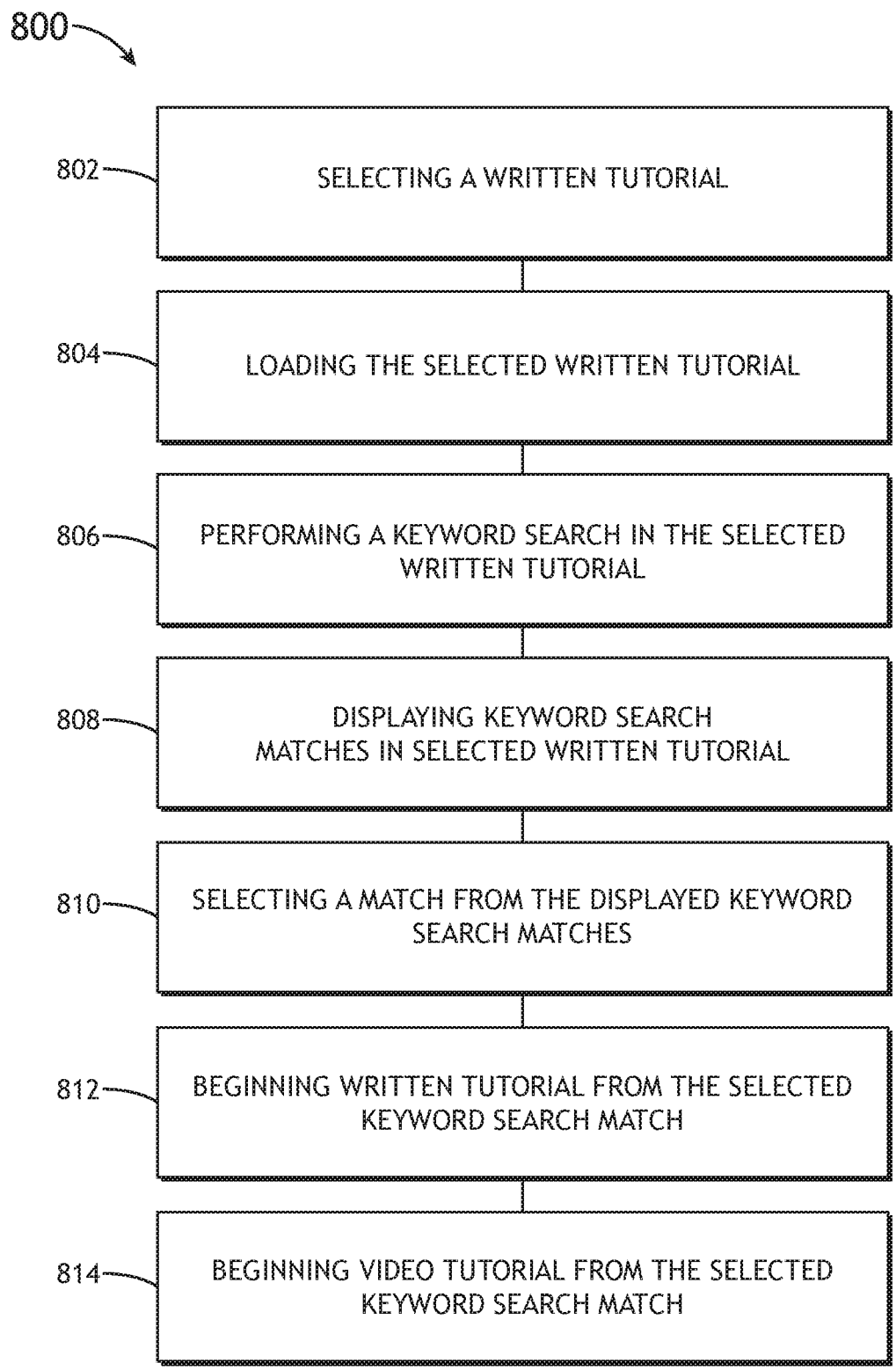
FIG. 8 illustrates a method of interacting with a tutorial, in accordance with one or more embodiments of the present disclosure.

FIG. 8 generally illustrates a method 800 for interacting with a location within a written tutorial, in accordance with one or more embodiments of the present disclosure. It is noted herein that the steps of method 800 may be implemented all or in part by system 100. It is further recognized, however, that the method 800 is not limited to the system 100 in that additional or alternative system-level embodiments may carry out all or part of the steps of method 800. In one embodiment, the method 800 includes steps to search within a single tutorial for one or more keywords or phrases. It is noted that a written tutorial includes a written set of instructions, transcripts, or word captions derived from a video tutorial.

Figure 9:
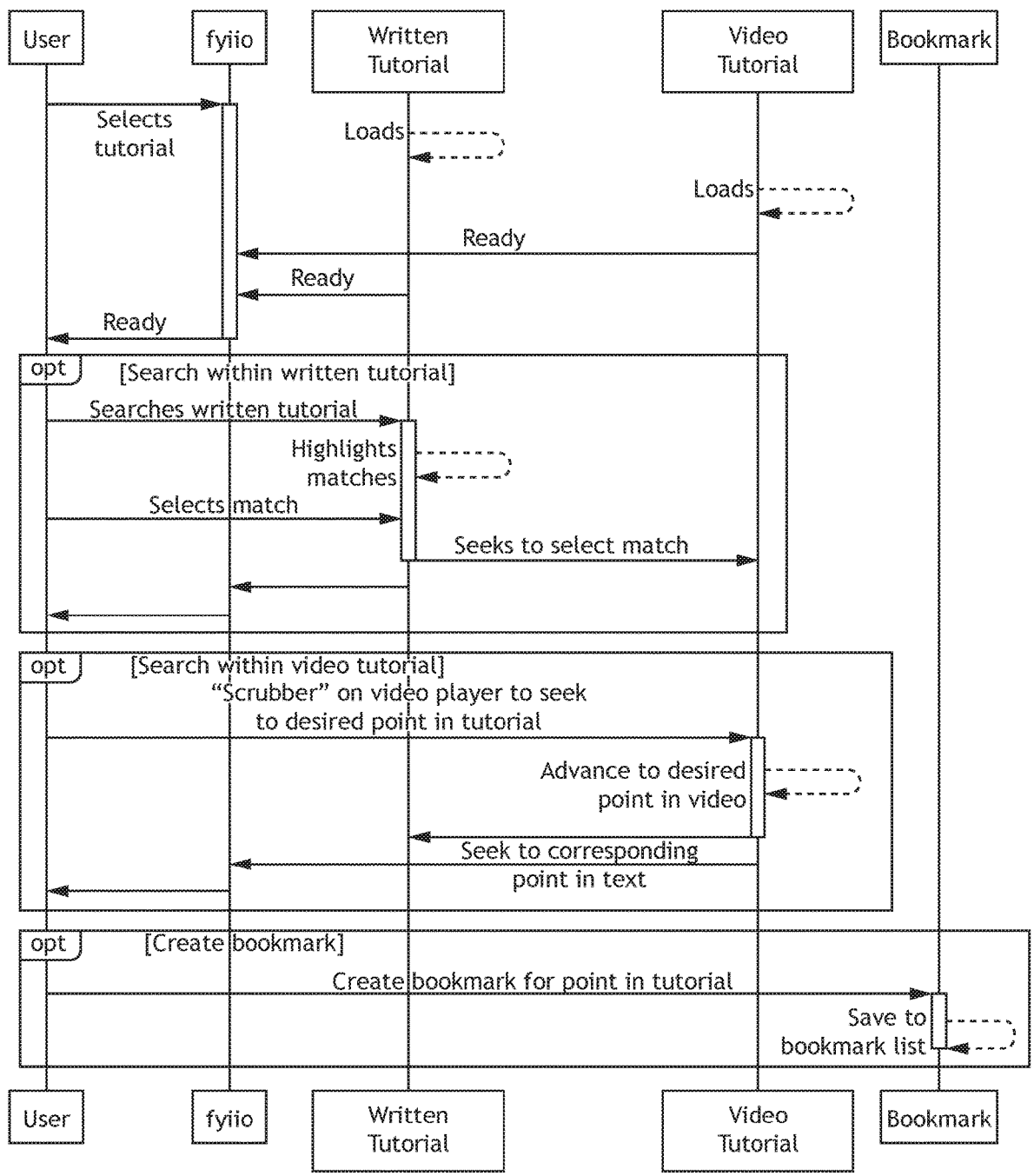
FIG. 9 illustrates a flowchart for interacting with a tutorial, in accordance with one or more embodiments of the present disclosure.

In a step 802, a written tutorial is selected for a search. This may be further understood with reference to FIG. 9. FIG. 9 illustrates a flowchart 900 for interacting with a tutorial, in accordance with one or more embodiments of the present disclosure. As shown in FIG. 9, a user may select a tutorial from a list of tutorials by inputting one or more input commands via a user input device 116.

In a step 804, the selected tutorial is loaded. For example, a written tutorial and a corresponding video tutorial may be loaded and transmitted to the user device 102 for viewing within a display page 301 produced on the display 114. In a step 806, a keyword search using one or more keywords and/or one or more phrases is performed on the selected written tutorial. For example, as shown in FIG. 9, a user may perform a keyword search within the selected tutorial.

In a step 808, one or more matches for the keyword search of the selected written tutorial are displayed. For example, matches within the written tutorial fitting the keyword search may be shown and displayed to the user via the user device 102. In a step 810, a match of the one or more displayed matches are selected. For example, as shown in FIG. 9, a user may input one or more input commands via user input device 116 in order to select a match of the one or more displayed matches.

In a step 812, the written tutorial is played starting at the point of the selected keyword search match. In a step 814, the video tutorial is played starting at the point of the selected keyword search match. For example, if the selected keyword search match is located at the halfway point of a tutorial, the video tutorial may begin to play at the half way point. In another embodiment, as shown in FIG. 9, one or more bookmarks may be created in order to mark record one or more locations within a tutorial. Bookmarks may be saved for later retrieval.

Figure 10:
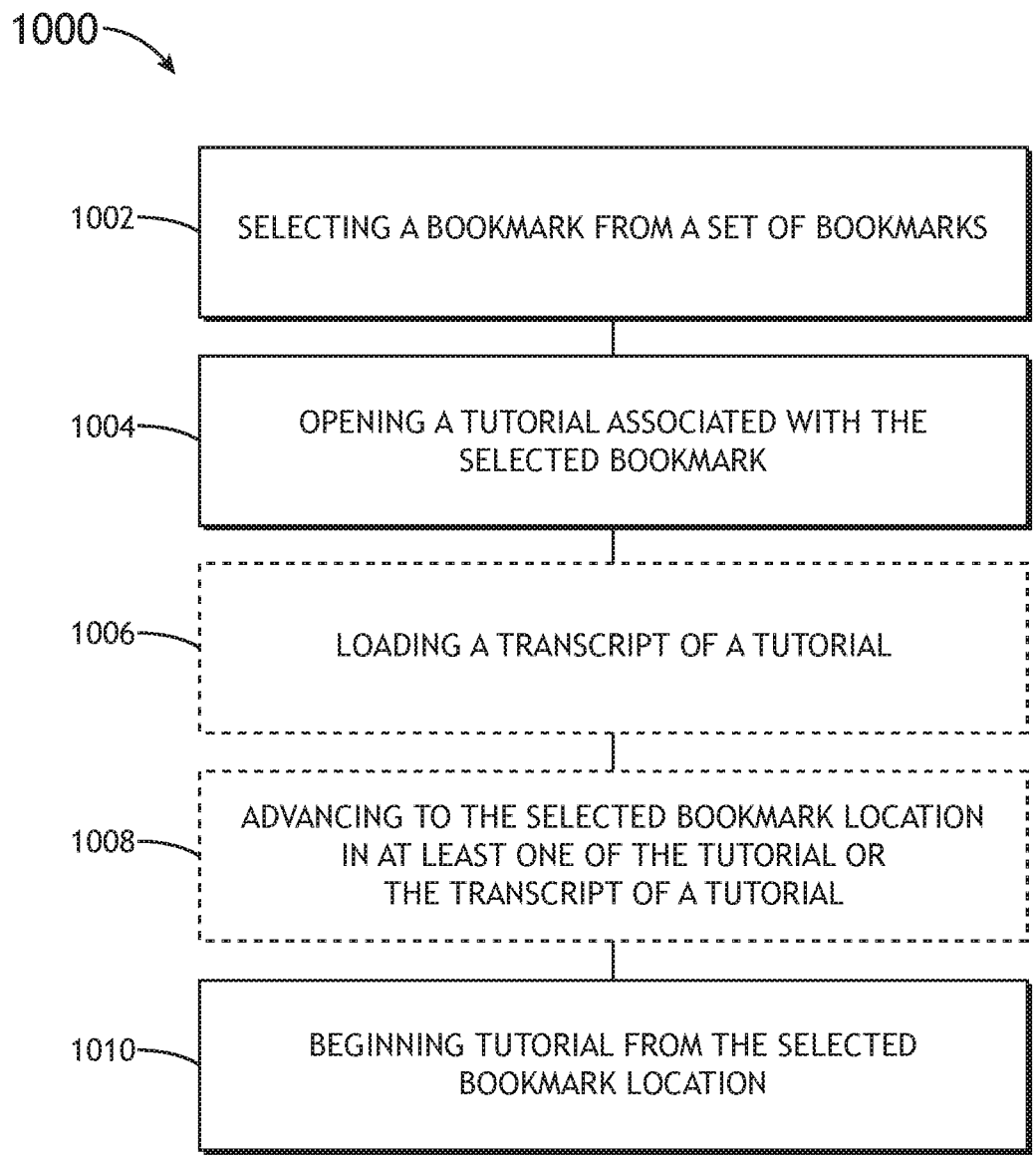
FIG. 10 illustrates a method of selecting a tutorial, in accordance with one or more embodiments of the present disclosure.

FIG. 10 illustrates a method 1000 of selecting a tutorial, in accordance with one or more embodiments of the present disclosure. It is noted herein that the steps of method 1000 may be implemented all or in part by system 100. It is further recognized, however, that the method 1000 is not limited to the system 100 in that additional or alternative system-level embodiments may carry out all or part of the steps of method 1000. In one embodiment, the method 1000 includes steps to select a bookmark that will open and begin a tutorial from a specific location within the tutorial.

Figure 11:
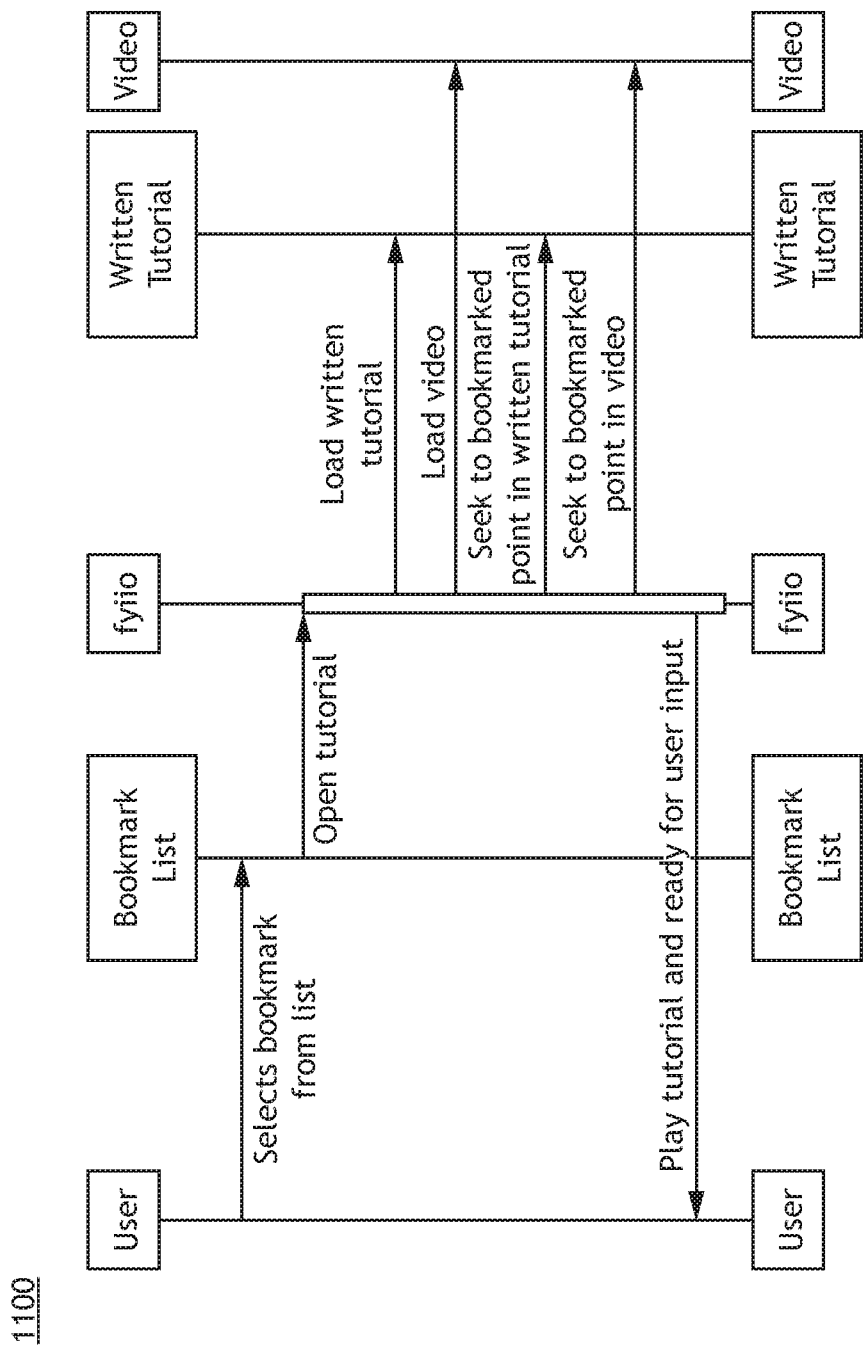
FIG. 11 illustrates a flowchart for utilizing bookmarks within a tutorial, in accordance with one or more embodiments of the present disclosure.

In a step 1002, a bookmark is selected from a set of bookmarks. This may be further understood with reference to FIG. 11. FIG. 11 illustrates a flowchart 1100 for utilizing bookmarks within a tutorial, in accordance with one or more embodiments of the present disclosure. As shown in FIG. 11, a user may be able to view and select a bookmark of a list of bookmarks displayed on a display page 301. For example, a bookmark in a list of bookmarks that identifies a specific location in a specific tutorial may be selected.

In a step 1004, a tutorial associated with the selected tutorial is opened. For example, as shown in FIG. 11, the tutorial associated with the selected bookmark may be opened and displayed on the display 114 of the user device 114. In a step 1006, a written set of instructions, transcripts, or word caption of a tutorial is loaded. For example, as shown in FIG. 11, at least one of a written set of instructions, transcripts, or word caption of a video tutorial is loaded. The written set of instructions, transcripts, or word captions of a video 302 may be stored in memory 110 of the user device 102.

In a step 1008, at least one of a tutorial, a written set of instructions, transcripts, or a word captions of a tutorial is advanced to the location of the selected bookmark. For example, as shown in FIG. 11, both the video tutorial and the written set of instructions may be advanced to the location within the video/instructions associated with the selected bookmark. For instance, a specific paragraph may be opened when a bookmark of a written tutorial is selected, and the video tutorial may be advanced to a specific frame associated with the selected bookmark. In a step 1010, the selected tutorial starts from the location of the bookmark. For example, as shown in FIG. 11, the video tutorial and the written instructions (e.g., written tutorial) may be advanced to the location associated with the selected bookmark and displayed on the user device 102.

The methods disclosed herein may include any other step(s) that can be performed by the output acquisition subsystem and/or computer subsystem(s) or system(s) described herein. The steps are performed by one or more computer systems, which may be configured according to any of the embodiments described herein. In addition, the methods described above may be performed by any of the system embodiments described herein. In this regard, it is noted herein the methods 200, 400, 600, 800, 1000 are not limited to the steps provided. For example, the methods 200, 400, 600, 800, 1000 may instead include more or fewer steps. By way of another example, the methods 200, 400, 600, 800, 1000 may perform the steps in an order other than provided. Therefore, the above description should not be interpreted as a limitation on the scope of the present disclosure, but merely an illustration.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
 a user device including a user interface, wherein the user interface includes a display and a user input device;
 one or more processors, wherein the one or more processors are communicatively coupled to memory;
 wherein the one or more processors are configured to execute a set of program instructions maintained in the memory and configured to cause the one or more processors to:
 receive a video;
 display a first prompt on the display for entry of a first text entry by a user;
 receive, from the user input device, the first text entry from the user via the first prompt;
 display a slidable video segment selection element, wherein the slidable video segment selection element indicates a segment selection of the video, wherein the slidable video segment selection element comprises a slidable video segment selection bar displayed over a video frame sequence bar, wherein the slidable video segment selection bar is slidable across the video frame sequence bar;

receive, from the user input device, a selection of a first segment of the video via the slidable video segment selection element;

display a synchronization soft key;

upon a first selection of the synchronization soft key via the user input device, synchronize the first text entry with the first segment of the video;

display an additional prompt on the display for entry of an additional text entry by the user;

receive, from the user input device, the additional text entry from the user via the additional prompt;

receive, from the user input device, a selection of an additional segment of the video via the slidable video segment selection element;

upon an additional selection of the synchronization soft key via the user input device, synchronize the additional text entry with the additional segment of the video, wherein the first segment of the video is identified on the video frame sequence bar with a first indicator when the first text entry is selected and the additional video segment is identified on the video frame sequence bar with an additional indicator different from the first indicator when the additional text entry is selected, wherein the first prompt displays the first indicator and the additional prompt displays the additional indicator so to associate the first prompt with the first video segment and the additional prompt with the additional video segment; and generate a text searchable tutorial based on the synchronization of the first text entry with the first segment of the video and the synchronization of the additional text entry with the additional segment of the video.

2. The system of claim 1, wherein at least one of the one or more processors are contained within at least one of the user device or a remote server.

3. The system of claim 1, wherein the one or more processors are further configured to:
display an image selection soft key, wherein the image selection soft key enables selection of at least one image for inclusion in the tutorial.

4. The system of claim 1, wherein the slidable video segment selection element is configured to allow viewing of one or more frames of the video.

5. The system of claim 1, wherein the first indicator is a first color and the additional indicator is an additional color.

6. The system of claim 1, wherein the user device comprises at least one of a desktop computing device, a laptop computing device, or a mobile computing device.

7. The system of claim 1, wherein the user device comprises a touchscreen-enabled device.

8. A system comprising:
a server including one or more processors and memory, wherein the one or more processors are communicatively coupled to the memory, wherein the server is communicatively couplable to a user device including a user interface, wherein the user interface includes a display and a user input device;

wherein the one or more processors are configured to execute a set of program instructions maintained on the memory and configured to cause the one or more processors to:

receive a video;

display a first prompt on the display for entry of a first text entry by a user;

receive, from the user input device, the first text entry from the user via the first prompt;

display a slidable video segment selection bar, wherein the slidable video segment selection bar indicates a segment selection of the video, wherein the slidable video segment selection bar is displayed over a video frame sequence bar, wherein the slidable video segment selection bar is slidable across the video frame sequence bar;

receive, from the user input device, a selection of a first segment of the video via the slidable video segment selection bar;

display a synchronization soft key, upon a first selection of the synchronization key via the user input device, synchronize the first text entry with the first segment of the video;

display an additional prompt on the display for entry of an additional text entry by the user;

receive, from the user input device, the additional text entry from the user via the additional prompt;

receive, from the user input device, a selection of an additional segment of the video via the slidable video segment selection bar;

upon an additional selection of the synchronization soft key via the user input device, synchronize the additional text entry with the additional segment of the video, wherein the first segment of the video is identified on the video frame sequence bar with a first indicator when the first text entry is selected and the additional video segment is identified on the video frame sequence bar with an additional indicator different from the first indicator when the additional text entry is selected, wherein the first prompt displays the first indicator and the additional prompt displays the additional indicator so to associate the first prompt with the first video segment and the additional prompt with the additional video segment; and generate a text searchable tutorial based on the synchronization of the first text entry with the first segment of the video and the synchronization of the additional text entry with the additional segment of the video.

9. The system of claim 8, wherein the one or more processors are further configured to:
display an add-step soft key, wherein the add-step soft key is configured to display an additional prompt.

10. The system of claim 8, wherein the one or more processors are further configured to:
display an image selection soft key, wherein the image selection soft key enables selection of at least one image for inclusion in the tutorial.

11. The system of claim 8, wherein the first indicator is a first color and the additional indicator is an additional color.

12. The system of claim 8, wherein the user device comprises at least one of a desktop computing device, a laptop computing device, or a mobile computing device.

13. A user device for generating video tutorials, comprising:

a display coupled to one or more processors, the display including a graphical user interface generated by the one or more processors, the graphical user interface comprising:
- a video window configured to display a video;
- a first prompt and a second prompt, wherein the first prompt and the second prompt include one or more input boxes configured to receive a first text entry and an additional text entry from a user;
- a slidable video segment selection element configured to receive a first segment selection of the video and an additional segment selection of the video from the user, wherein the slidable video segment selection element comprises a slidable video segment selection bar displayed over a video frame sequence bar, wherein the slidable video segment selection bar is slidable across the video frame sequence bar;
- a synchronization soft key configured to synchronize the first text entry with the first segment selection of the video upon a first selection of the synchronization soft key, and further configured to synchronize the additional text entry with the additional segment selection of the video upon an additional segment selection of the synchronization soft key, wherein the first segment of the video is identified on the video frame sequence bar with a first indicator when the first text entry is selected and the additional video segment is identified on the video frame sequence bar with an additional indicator different from the first indicator when the additional text entry is selected, wherein the first prompt displays the first indicator and the additional prompt displays the additional indicator so to associate the first prompt with the first video segment and the additional prompt with the additional video segment; and
- a publication soft key configured to generate a text-searchable tutorial based on the synchronization of the first text entry with the first segment selection of the video and the synchronization of the additional text entry with the additional segment selection of the video.

* * * * *